(12) United States Patent
Jones et al.

(10) Patent No.: US 10,402,201 B2
(45) Date of Patent: Sep. 3, 2019

(54) METHOD AND APPARATUS FOR DETECTING MEMORY CONFLICTS USING DISTINGUISHED MEMORY ADDRESSES

(71) Applicants: Joel Kevin Jones, Alameda, CA (US); Ananth Jasty, San Jose, CA (US)

(72) Inventors: Joel Kevin Jones, Alameda, CA (US); Ananth Jasty, San Jose, CA (US)

(*) Notice: Subject to any disclaimer, the term of this patent is extended or adjusted under 35 U.S.C. 154(b) by 36 days.

(21) Appl. No.: 15/455,070

(22) Filed: Mar. 9, 2017

(65) Prior Publication Data

US 2017/0177371 A1    Jun. 22, 2017

(51) Int. Cl.
| | |
|---|---|
| *G06F 9/312* | (2018.01) |
| *G06F 9/34* | (2018.01) |
| *G06F 9/38* | (2018.01) |
| *G06F 12/06* | (2006.01) |
| *G06F 9/30* | (2018.01) |

(52) U.S. Cl.
CPC .......... *G06F 9/3838* (2013.01); *G06F 9/3009* (2013.01); *G06F 9/30043* (2013.01); *G06F 9/3834* (2013.01); *G06F 9/3885* (2013.01); *G06F 12/0646* (2013.01); *G06F 9/30145* (2013.01); *G06F 9/3836* (2013.01); *G06F 9/3851* (2013.01); *G06F 2212/1032* (2013.01)

(58) Field of Classification Search
CPC .. G06F 9/3836; G06F 9/3838; G06F 9/30043; G06F 9/3009; G06F 9/30125; G06F 9/3834; G06F 9/3857; G06F 9/3851; G06F 9/3885; G06F 9/4806; G06F 9/4881; G06F 12/0646; G06F 2212/1032; G06F 9/30123; H05K 999/99
USPC ......................................... 712/208, 216, 219
See application file for complete search history.

(56) References Cited

U.S. PATENT DOCUMENTS

| | | | | |
|---|---|---|---|---|
| 6,349,382 | B1 * | 2/2002 | Feiste ................... | G06F 9/3824 712/216 |
| 7,730,283 | B2 * | 6/2010 | Luick .................... | G06F 9/3853 712/216 |
| 2016/0103681 | A1 * | 4/2016 | Alexander ............ | G06F 9/3834 711/125 |

OTHER PUBLICATIONS

Ceze, Luis et al.,Bulk Disambiguation of Speculative Threads in Multiprocessors, Proceeding ISCA '06 Proceedings of the 33rd annual international symposium on Computer Architecture pp. 227-238.

* cited by examiner

*Primary Examiner* — Daniel H Pan

(57) ABSTRACT

A method and apparatus for detecting potential memory conflicts in a parallel computing environment by executing two parallel program threads. The parallel program threads include special operands that are used by a processing core to identify memory addresses that have the potential for conflict. These memory addresses are combined into a composite access record for each thread. The composite access records are compared to each other in order to detect a potential memory conflict.

20 Claims, 18 Drawing Sheets

MERGING UNIT DIAGRAM

SAMPLE FOR 3 CAR RECORDS COMPOSITE ACCESS RECORD OVERLAY CIRCUIT

METHOD AND APPARATUS FOR DETECTING MEMORY CONFLICTS USING DISTINGUISHED MEMORY ADDRESSES

BACKGROUND

In this modern era of electronics, it seems that everything is becoming smaller, faster and cheaper. This also holds true for processing systems. In its basic form, a processing system includes a processing unit, a memory and some form of data input and data output. And, each of these elements has become smaller, faster and cheaper.

Even though the size of a processing unit has decreased over the years, current integrated chip technology may prevent further reduction in size. It is not that the processors cannot be made smaller, they can. However, at this point, the cost associated with making processors smaller is difficult to justify. Memory can also be made smaller, but again the cost of doing so may also not be justified.

Today, some of the most powerful processors are fabricated using 14 nanometer feature sizes. A nanometer is one billionth of a meter. These very small feature sizes are difficult, but not impossible to achieve. Even still, there is an ultimate minimum feature size that is dictated by the size of an atom. Once that minimum feature size is reached, it is not likely that further size reduction could be realized. Despite the physical, minimum feature size barrier, next generation silicon chips are moving toward 5 nanometer, and even smaller feature sizes. Research suggests that the smallest feature size needed to form a transistor may be about 5 nanometers.

Achieving greater and greater processing speeds using silicon technology has always been limited by the feature size of the processors of the day. The smaller the feature size, the faster computing operations can be performed. Of course, since these computing operations are stored in a memory, the feature size of the memory also dictates performance. No matter how fast processors and memories are, there is always a need to have more and more processing performance.

In the very early days of computing, processors and memories were much, much slower than their modern integrated circuit counterparts. Performance offered by those early processing systems was, just as now, never enough. In order to overcome the performance limitations of those early processing systems, the notion of parallel processing emerged.

Parallel processing recognizes that any single processor may not have enough performance to achieve a particular computing task. Accordingly, additional processors were added at a system level in order to achieve higher performance benchmarks. By adding more processors, computer systems engineers were able to increase overall performance, but this came at a great cost of additional complexity.

At a system level, just adding more processors does not increase performance unless the computer program that is executed by the processors is partitioned so that the program can be executed by more than one processor at the same time. There are two predominate ways that a computer program can be partitioned so as to take advantage of multiple processing units. These two partitioning methods are known as "serial thread" and "parallel thread".

In serial threaded multi-processing, the program is partitioned so that a portion of the program is executed by a first processor and a second portion is executed by a second processor. In this scenario, the first processor creates an output that is fed into the second processor. As one can imagine, this "serial thread" is relatively simple to create. This is because the data memory of the first processor is not shared by the second processor, except for sending the result of the first processor to the next.

Although simple to implement, serial thread implementations are really limited in terms of application. In a nut shell, unless the first and second processors are working on a recurring stream of input data, there is no real benefit in speeding up performance. It is much like an assembly line where each worker only attaches a particular component to a car. The amount of time that goes into the assembly of the car is not reduced, but merely distributed amongst several workers that do not work on the car at the same time.

In a "parallel thread" structure, the task of partitioning the computer program is exceptionally complex. In early systems, it was the computer programmer that needed to identify what portions of the program could work in parallel. Today, a specialized compiler can search for program "threads" that have the potential for parallel execution. In most situations, a specialized compiler is used in conjunction with code analysis, performed by the computer programmer, to achieve optimum results.

All of this seems very complicated, and it is. But, that does not mean these techniques cannot be visualized in simple terms. For example, FIGS. 1A and 1B are pictorial diagrams that describe some background concepts. These background concepts may be helpful in understanding the issues at hand here.

FIG. 1A depicts prior art in the form of a simpler, parallel processing structure where the output of a first processor 15 is fed into a second processor 30. The second processor 30 then operates on the input it receives from the first processor 15. In such an implementation, the first processor 15 executes a first program thread ("Thread A"), which is stored in a first program memory 10. The second processor 30 executes a second program thread ("Thread B"), which is stored in a second program memory 25. As these first and second processors (15, 30) operate, they interact with what is essentially a private memory of their own, data memories 20 and 35 respectively. It can easily be seen that the actions of the first processor 15 cannot interfere with the actions of the second processor 30. This is because the two processors, effectively, never access the memory of their counterparts.

FIG. 1B depicts the more complicated situation where two program threads (C and D) are executed in independent processors (45 and 60) that each interact with a single memory 50. In this implementation, a first thread ("Thread C") is stored in a first program memory 40. A second thread ("Thread D") is stored in a second program memory 55. Nothing complicated so far.

In this implementation, however, any processor can access any data memory location because each processor accesses data that is stored in a single data memory 50. Here, the first processor 45, as it executes Thread C, may access the same memory locations as may the second processor 60 as it executes Thread D. As seen in FIG. 1B, there may be variables stored in the single memory 50 that are accessed by both processors (45, 60) as they execute their particular program threads.

When these types of architectures were first developed, sophisticated hardware was needed to make sure that two memory locations were not accessed by the two program threads in a manner that would cause inconsistent results. As an example, if program Thread C calculated a value for Variable A and stored that value in the memory, it was important to detect if Thread D also stored a value in Variable A. If this type of event was detected, there was a conflict and program execution was halted. Yet another problem occurs when Variable A is needed by Thread D, but Thread C has not yet written a value to Variable A. This problem added even further complexity to the conflict detection hardware because there is not only a problem when two threads write a value to the same variable, there is also a timing problem when a thread needs data that has not yet been stored in the memory by another thread.

One early mechanism for preventing such conflict errors included the use of memory locks. A memory lock allows one processor to maintain exclusive control over part of the memory. That way, if the first processor 45 wants to write to Variable A, it can prevent the second processor 60 from overwriting the value stored there by the first processor 45 until it was safe for the second processor 60 to have access to the variable. This, of course, could cause the two processors to "deadlock". This can occur when one processor dominates control over a memory location. The second processor would need to suspend its execution until the first processor releases the memory. In these memory subsystems, each memory location must be monitored to make sure that a conflict has not occurred.

Memory locks are only appropriate in a memory subsystem that allows direct access to the memory based on a particular address. This has been the basic and most traditional memory structure. Modern memory subsystems use a different mechanism for allowing a processor to access a memory location. These modern memory subsystems are called "transactional memories". In a transactional memory environment, a processor accesses a memory location by means of a "transaction". A transaction is essentially a command sent by a processor to a memory controller.

A transactional memory allows a processor to continue execution once the transaction is sent to the memory subsystem. Rules for each type of transaction allow for more sophisticated memory conflict detection and "recovery". When a conflict is detected, the memory can be restored to an earlier state because each transaction can be buffered and then "rolled back" to a known safe state when a conflict is detected. But, the use of transaction memory alone still requires more and more complicated comparison hardware as the size of a dataset to be accessed by any thread increases. Of course, transactional memory can sometimes be used effectively when small datasets are manipulated by two or more processing threads.

There have been many discussions regarding when and how conflicts should be detected. In all of these discussions, the underlying remaining constant is that each and every address that is accessed by each and every thread must be recorded and then compared from thread to thread in order to detect a conflict. This, of course, requires complicated, register-based comparison logic.

One notable treatise is presented by Ceze, et al. and is entitled *Bulk Disambiguation of Speculative Threads in Multiprocessors*. Ceze teaches that each addresses of each transaction can be combined into an "access signature" for each program thread. Ceze adds to the art by introducing a disambiguation mechanism so that each address can be extended to a non-ambiguous comparison address. These extended addresses are then combined in order to create the access signature that represents all data accesses by a thread during its program execution lifetime.

By combining the extended addresses, the address of each access performed by each thread is represented in its corresponding access signature. Then, the access signature is compared against the access signatures of other threads operating in the system. Ceze contemplates that each address that is included in the access signature is unambiguously represented. But, representing the address in an unambiguous manner is difficult to achieve. Ceze recognizes that the process or extending an address will often result in ambiguous representation of addresses accessed by a thread. This results in address aliasing. Such address aliasing can result in false positive conflict detections. Of course, the rate of false positives can be reduced by extending the size of the extended address used in generating the access signature.

The use of an access signature results in a notable reduction in the complexity of the comparison hardware when detecting inter-thread conflicts. Ceze then suggests that the comparison of the access signatures should be accomplished after a particular thread has finished executing. At that point, any conflict would result in termination of a thread and any threads that depend on the output of that thread.

BRIEF DESCRIPTION OF THE DRAWINGS

Several alternative embodiments will hereinafter be described in conjunction with the appended drawings and figures, wherein like numerals denote like elements, and in which.

DETAILED DESCRIPTION

As already discussed, the notion of using some form of descriptor that represents all accesses to a memory over a particular interval of time can greatly decrease the complexity of hardware used to identify inter-thread conflict detection. The problem is that when all accesses to the memory are reflected in a single descriptor, that descriptor can quickly saturate. This saturation is precisely the mechanism that causes address aliasing as described by Ceze.

In the interest of clarity, several example alternative methods are described in plain language. Such plain language descriptions of the various steps included in a particular method allow for easier comprehension and a more fluid description of a claimed method and its application. Accordingly, specific method steps are identified by the term "step" followed by a numeric reference to a flow diagram presented in the figures, e.g. (step 100). All such method "steps" are intended to be included in an open-ended enumeration of steps included in a particular claimed method. For example, the phrase "according to this example method, the item is processed using A" is to be given the meaning of "the present method includes step A, which is used to process the item". All variations of such natural language descriptions of method steps are to be afforded this same open-ended enumeration of a step included in a particular claimed method.

Figure 1A:
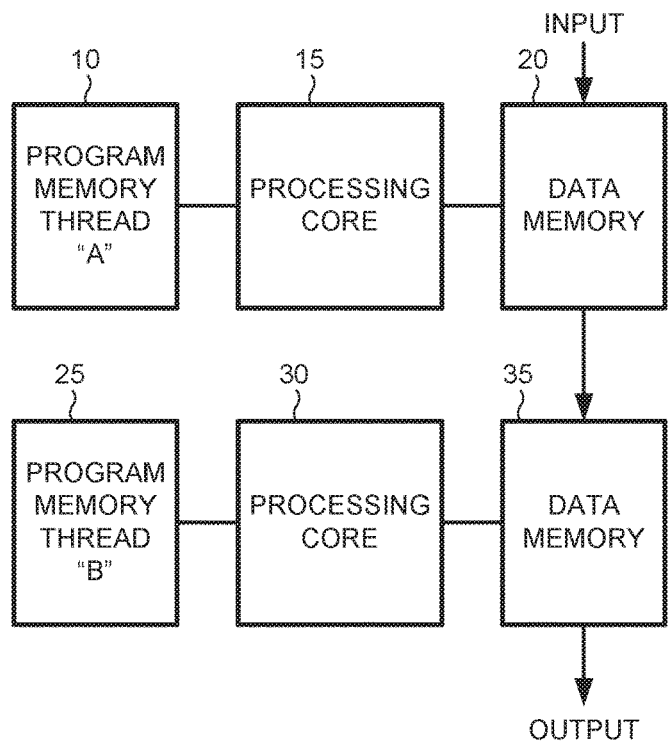
FIG. 1A depicts prior art in the form of a simpler parallel processing technique where parallel threads do not share data memory.
Figure 1B:
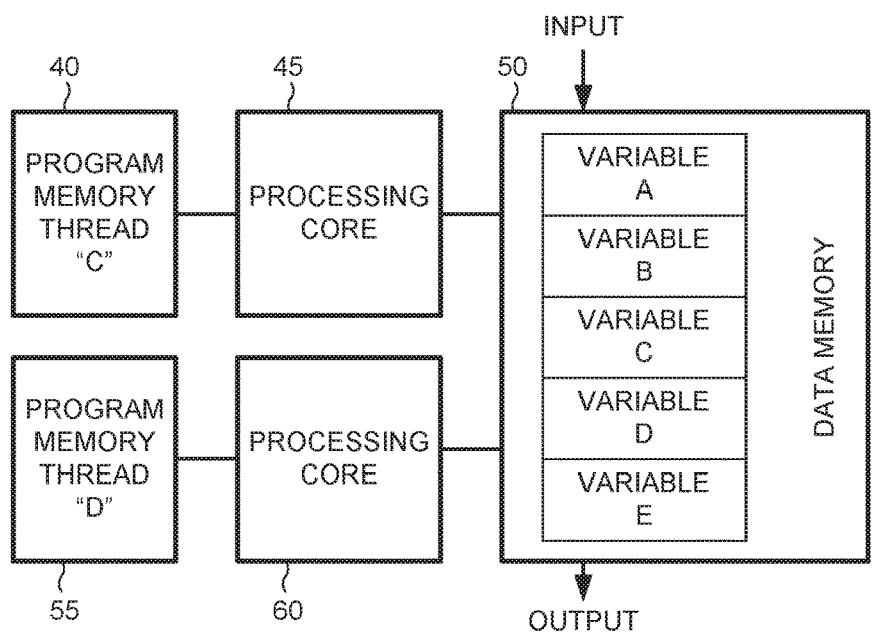
FIG. 1B depicts prior art in the form of a more complicated parallel processing technique where parallel threads do share data memory.
Figure 2:
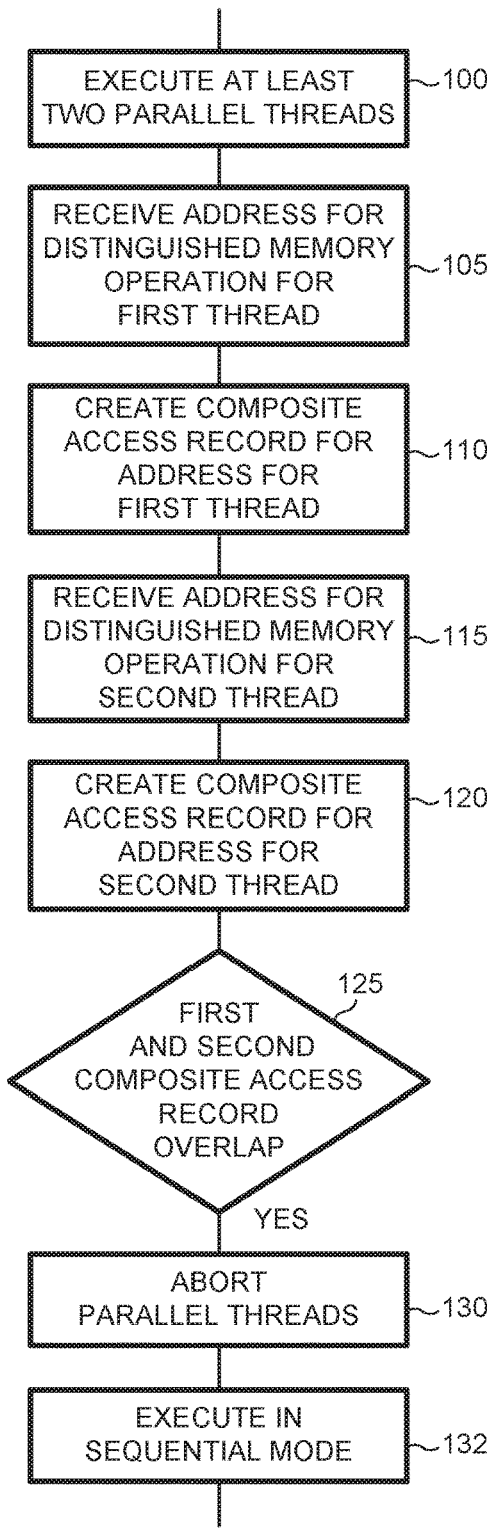
FIG. 2 is a flow diagram that depicts one example method for identifying memory conflicts in a parallel computing environment.

FIG. 2 is a flow diagram that depicts one example method for identifying memory conflicts in a parallel computing environment. In this example method, at least two parallel threads are executed (step 100). It should be appreciated that any such parallel thread, according to one illustrative use case, is executed by a particular processing core included in the parallel computing environment. Accordingly, a parallel thread executing in a first processing core executes substantially contemporaneously with a second parallel thread that is executed in a second processing core.

According to this example method, any parallel thread that is executed by a particular processing core includes memory access operations. One characteristic of the memory access operations included in a parallel thread is that the parallel thread includes memory access operations that are "distinguished" according to their potential for memory conflict. As such, it should be understood that any parallel thread prepared for use according to the present method includes at least one of a non-distinguished memory access operation and a distinguished memory access operation.

A memory operation that is non-distinguished is merely any memory operation for accessing memory wherein there is a certainty that such non-distinguished memory operations will not cause a conflict with other memory operations generated by other threads executing in parallel with a first parallel thread. A distinguished memory operation is herein defined as a memory operation that, according to analysis either by a compiler or by a programmer, is determined to have a potential for conflicting with memory operations conducted by a parallel thread.

According to this example method, as any particular thread is executed by a particular processing core, the parallel thread will conduct at least one of a non-distinguished memory operation and a distinguished memory operation. When a first parallel thread conducts a distinguished memory operation, the address of the distinguished memory operation is then received for a first parallel thread (step 105). It should be appreciated that the distinguished memory operation, according to one illustrative use case, is generated by a first processing core when it executes a distinguished memory operation included in the program flow of the first parallel thread. According to various illustrative use cases, this is accomplished by recognizing a "distinguished" instruction that is executed by the first processing core.

When the address of the distinguished memory operation is received, it is used to create a composite access record for the first parallel thread (step 110). According to one illustrative use case, this is accomplished by a specialized hardware element that captures the address of the distinguished memory operation and uses that address in the formation of a composite access record. In stark contrast with Ceze, the present method excludes non-distinguished memory operations when a composite access record is created. It should be appreciated that, because the composite access record is based on the address of selected "distinguished" memory operations, the potential for address aliasing is exceedingly diminished. All non-distinguished memory operations are ignored for the purpose of creating a composite access record.

As a composite access record is created for the first parallel thread, a composite access record is also created for the second parallel thread. Accordingly, this present method provides for receiving an address for a distinguished memory operation for the second thread (step 115). Using only the addresses of distinguished memory operations, a composite access record is also created for the second thread (step 120).

As composite access records are created for two or more parallel threads according to the present method, the composite access records are compared to each other in order to determine if there is a potential conflict in a memory access. According to this example method, any overlap in the first and second composite access records results in the declaration of a potential conflict (step 125). Once a potential conflict is detected in this manner, one alternative example method provides for aborting execution of the parallel threads (step 130). According to yet another alternative example method, the parallel threads are executed sequentially (step 132) in the event that parallel execution is aborted.

Figure 3:
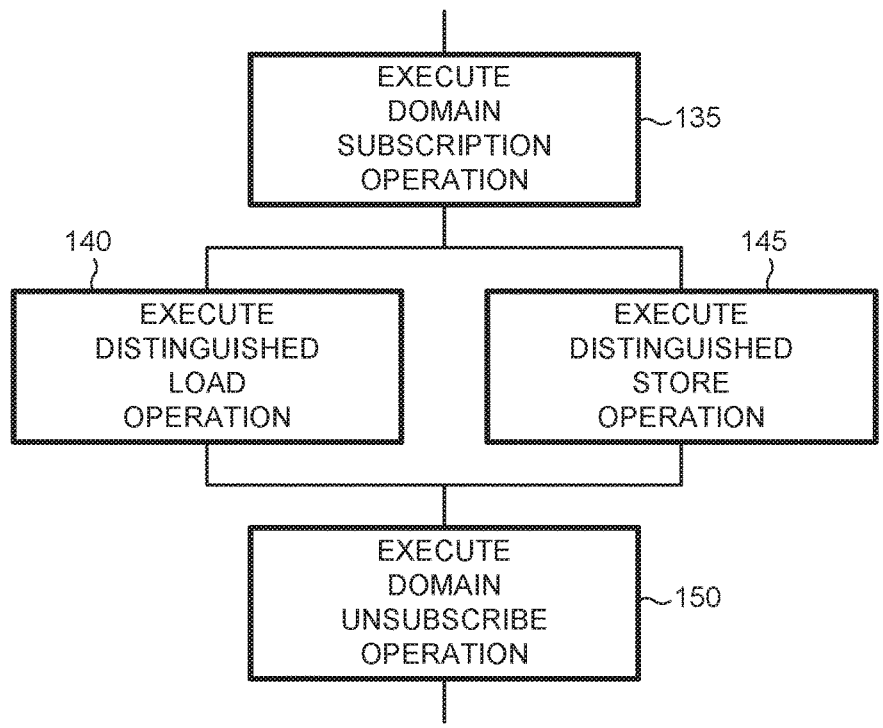
FIG. 3 is a flow diagram that depicts one alternative example method for executing a parallel thread.

FIG. 3 is a flow diagram that depicts one alternative example method for executing a parallel thread. It should be appreciated that there must be some mechanism for managing the mechanics associated with generating a composite access record. This alternative example method recognizes that a parallel thread operates in a particular address domain.

Accordingly, a parallel thread needs to register itself with such a particular address domain.

At a system level, it is necessary to establish a transaction domain which is used by a plurality of processing cores to execute parallel threads. When such a transaction domain is created, any resources pertaining to inter-thread memory conflict need to be engaged. For example, one alternative method provides for the use of hardware that records the addresses of memory accesses conducted by each core in a parallel processing system and hardware that detects conflicts based upon the addresses recorded for each processing core. It should be appreciated that only those addresses that are identified as having a potential for memory conflict are so recorded and subsequently used in inter-thread memory conflict detection. Accordingly, any hardware used to record the addresses of distinguished memory accesses for each individual processing core and any hardware used to compare the recorded addresses of accesses conducted by the individual processing cores is assigned and initialized.

In one example illustrative use case, the present method is preceded by the creation of a transaction domain as heretofore described. It should be appreciated that the transaction domain comprises a set of hardware for use in identifying potential memory conflicts that are used collectively by all processing cores operating in parallel according to the method and techniques herein described. According to one illustrative use case, this is done by execution of a new operation called "create transaction domain". In should be appreciated that such a preceding step is included in one variation of the claimed method.

The "create transaction domain" operation, according to various alternative methods, is used to assign one or more particular processing cores to a particular inter-thread conflict detection means. The create transaction domain operation, according to this example alternative method, also initializes any hardware associated with not only the inter-thread conflict detection means but, according to yet another alternative example method, also initializes any hardware that is used to record the addresses of distinguished memory accesses conducted by the one or more processing cores assigned to that particular inter-thread conflict detection means.

Once a transaction domain is established, this alternative example method provides for executing a "domain subscription" operation (step 135). By executing the "domain subscription" operation, the particular parallel thread, when executed by a processor, causes any former composite access record to be discarded. Hence, as the parallel thread begins execution, a new composite access record is initiated and updated according to the addresses of distinguished memory operations. The "domain subscription" operation, among other things, enables a composite access record to be included in any inter-thread memory conflict detection. According to yet another alternative example method, the process of subscribing to a particular domain also provides for identifying a sequence of processor operations, for example a "call-back" function, that should be executed in the event that a conflict is detected.

According to this alternative example method, execution of a parallel thread by a processor includes at least one of execution of a distinguished load operation (step 140) and execution of a distinguished store operation (step 145). As heretofore discussed, when a distinguished load operation is conducted by a particular processing core, the composite access record associated therewith is updated according to the address of the distinguished load operation. Likewise, when a processor conducts a distinguished store operation, the address of the distinguished store operation is used to update the associated composite access record. Again, it is notable that only distinguished memory accesses conducted by a particular parallel thread are used to update the composite access record.

Figure 4:
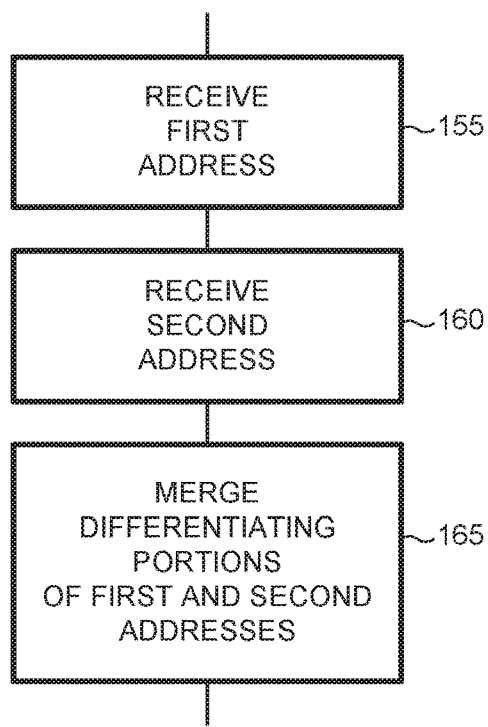
FIG. 4 is a flow diagram that depicts one alternative method for creating composite access record.

FIG. 4 is a flow diagram that depicts one alternative method for creating composite access record. According to this alternative example method, a composite access record is created by receiving a first address (step 155) and then receiving a second address (step 160). It should be appreciated that, according to this example method, the first and second addresses pertain to memory accesses performed by a particular thread and which are associated with a distinguished memory access operation. Once the first and second addresses are received, they are merged in order to create a composite access record. It should be appreciated that, in this alternative example method, differentiating portions of the first and second addresses are merged (step 165).

A differentiating portion of the first or second address, according to alternative example methods, comprises a lower portion of an address. For example, a thread may be executing in a particular page of memory, where the page is identified by an upper portion of the address. Accordingly, the upper portion of the address will typically be the same for all addresses that are accessed by a particular thread when it is executed by a particular processing core. Hence, if the upper portions of the addresses are typically the same for all of the distinguished addresses then saturation occurs essentially immediately. The lower portion of the address will vary based upon what portion of a memory page is intended to be accessed by a particular parallel thread as it is executed by a particular processing core. In some cases, the entire address itself is differentiating.

Figure 5:
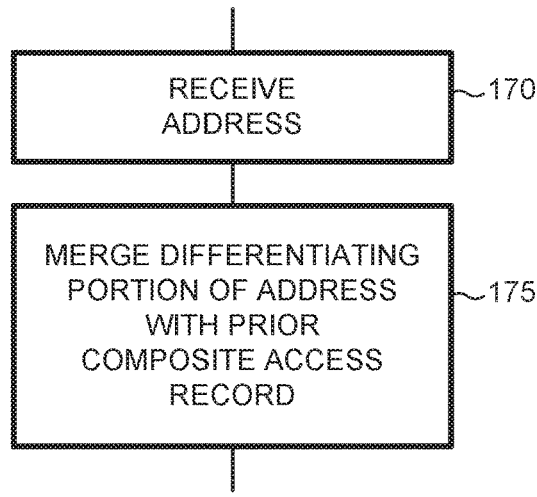
FIG. 5 is a flow diagram that depicts one alternative method for updating a composite access record according to subsequent memory access operations.

FIG. 5 is a flow diagram that depicts one alternative method for updating a composite access record according to subsequent memory access operations. According to this alternative example method, an address is received (step 170). A differentiating portion of the received address is then merged with a prior composite access record (step 175). It should be appreciated that, according to this example alternative method, a composite access record is stored and then updated with additional address information as a new address is received. Accordingly, when a thread begins execution the initial composite access record is cleared, or otherwise initialized. When a first address is received, it is stored as the initial composite access record. The stored composite access record is then merged with an address that is subsequently received according to the present method. Again, it should be noted that all of these addresses comprise addresses that are associated with distinguished memory accesses performed by a processing core as it executes a particular parallel thread.

Figure 6:
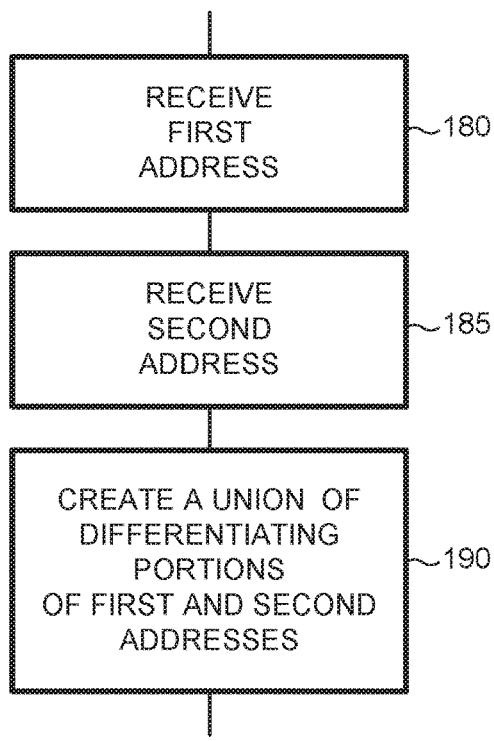
FIG. 6 is a flow diagram that depicts one alternative method for merging a first and second address in order to form a composite access record.

FIG. 6 is a flow diagram that depicts one alternative method for merging a first and second address in order to form a composite access record. In this alternative method, a first address is received (step 180) and a second addresses received (step 185). The first and second addresses are merged by creating a union of differentiating portions of the first and second received addresses (step 190). A process of creating a union occurs by simply performing a bit-wise "OR" of the first and second addresses. As additional memory operations are performed by a particular parallel thread, subsequent addresses, according to yet another alternative method, are further merged with the first and second addresses using a bit-wise "OR" merging technique. This method for creating a union is applicable to all alternative methods for creating a composite access record as herein described.

Figure 7:
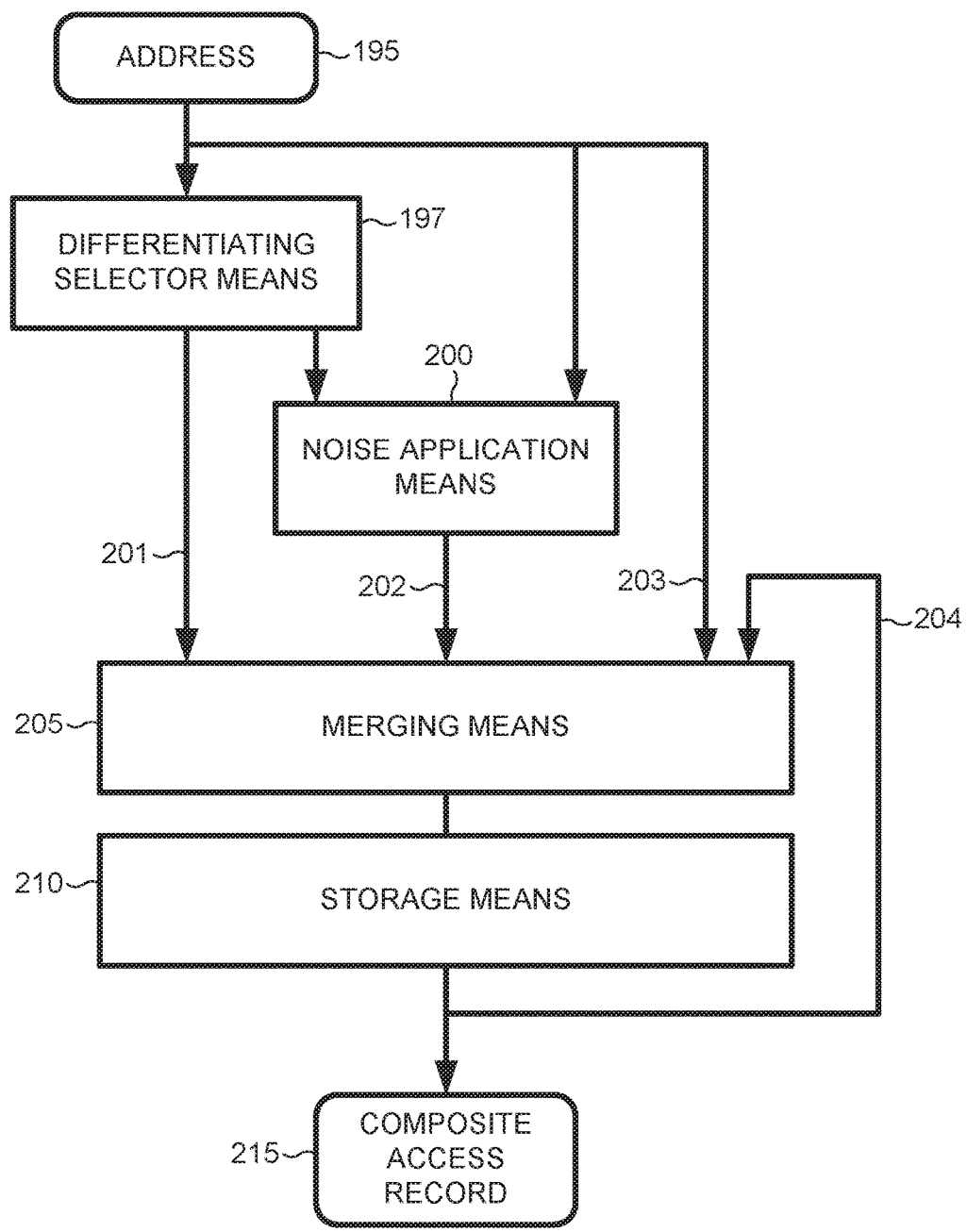
FIG. 7 is a pictorial diagram that represents various alternative methods for creating a composite access record.

FIG. 7 is a pictorial diagram that represents various alternative methods for creating a composite access record. As heretofore described, an address 195 is received in a mechanism for creating a composite access record 215. The address received 195 comprises an address that is associated with a memory operation that is distinguished, i.e. has a potential for a memory conflict. The address that is received, according to one alternative method, is subject to a differentiating selector means 197. The differentiating selector means 197, according to one alternative method, comprises functional logic that selects a portion of the address that differentiates one memory access from another.

As already described, some illustrative use cases where the present method is applied may cause a particular parallel thread to use a particular page of memory. Hence, if all memory accesses, and especially distinguished memory accesses use the same page of memory there is little benefit in using a page-pointer portion of a memory address because that page-pointer portion of the memory address is typically used to select the same memory page. By selecting a more differentiating portion of the address, address aliasing is less likely to occur as a particular parallel thread is executed.

In some alternative methods, an address that is received 195 is subject to a noise application means 200. As depicted in the figure, the noise application means, according to various alternative methods, receives at least one of an address itself and a differentiating portion of the address. It should be appreciated that, according to various alternative methods, the noise application means provides additional reduction in address aliasing by widening a received address or a differentiating portion of the address.

According to one alternative method, the noise application means utilizes a hash table in order to generate a wider descriptor then the address (or a differentiating portion of the address) received by a merging means 205. Any suitable hash function may be applied in the application of the present method and the teachings herein presented. It should also be appreciated that the wider the output of the noise application means, the less likely address aliasing will occur.

It should be further appreciated that, according to various alternative methods, the structure of the hash table is modified in order to minimize the likelihood of address aliasing. For example, a hash table may be structured so as to create hash values that are generated in a manner to minimize address aliasing based on a priori knowledge of the memory addresses that have the potential for conflict. Hence, certain bits in an address field can be adjusted through the hash table to result in non-overlapping outputs for the addresses that are most susceptible to conflict.

As already described, the merging means 205, according to various alternative applications of the present method, receives at least one of the output of the differentiating selector means 201, the output of the noise application means 202 and the unmodified address itself 203. According to various alternative methods, a storage means 210 is used to store a composite access record once the composite access record is generated according to the address 195 associated with a distinguished memory access. The output of the storage means 204, according to various alternative methods, is fed back into the merging means 205 in order to merge a former value of the composite access record with the various other alternative forms of the received address, or the received address itself.

Figure 8:
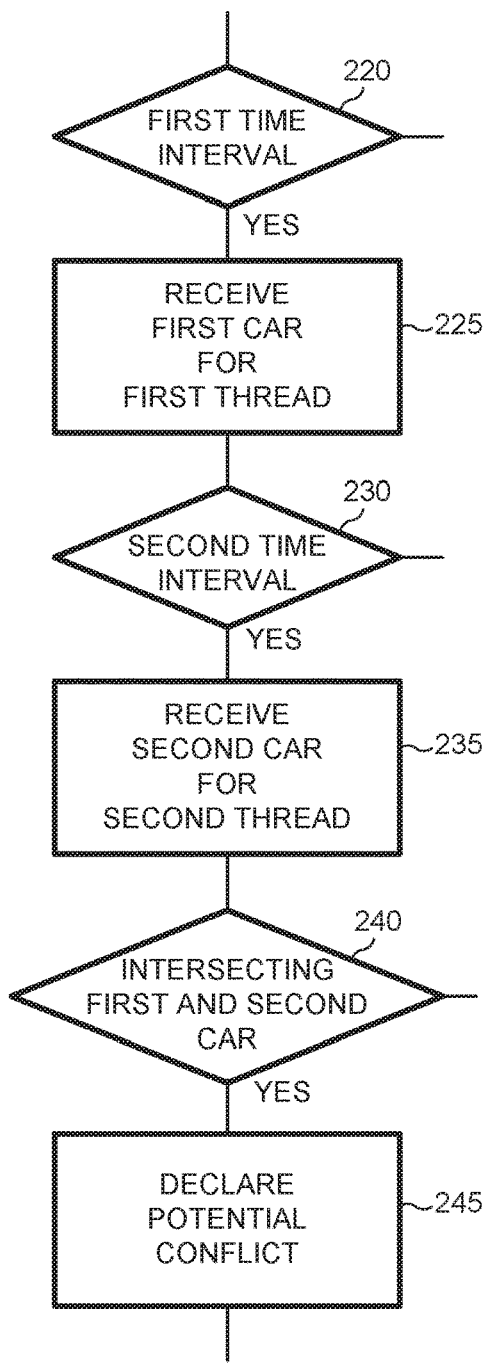
FIG. 8 is a flow diagram that depicts an alternative method for detecting an inter-thread memory conflict on a periodic basis.

FIG. 8 is a flow diagram that depicts an alternative method for detecting an inter-thread memory conflict on a periodic basis. According to this example method, inter-thread memory conflicts are detected on a periodic basis. As such, this alternative example method includes a step for waiting for a first time interval to expire (step 220). Once the first time interval expires, a first composite access record is received for a first parallel thread (step 225). Then, once a second interval of time expires (step 230), a second composite access record is received for a second parallel thread (step 235).

It should be appreciated that, at least according to one illustrative use case, hardware timers are associated with each program thread that is executing in parallel. In yet another alternative illustrative use case, the present method utilizes hardware timers that are closely coupled to a processing core. In this illustrative use case, the processing core also includes a composite access record generator, which is triggered by the hardware timer. Once it is so triggered, the composite access record generator directs a current composite access record ("CAR") to an inter-thread memory conflict detection system.

According to this alternative example method, once the first and second composite access records are received, they are compared to each other in order to determine if there is an intersection between the first and second composite access records (step 240). In yet another alternative example method, should such an intersection be found between the first and second composite access records, then a potential conflict is declared (step 245).

Figure 9:
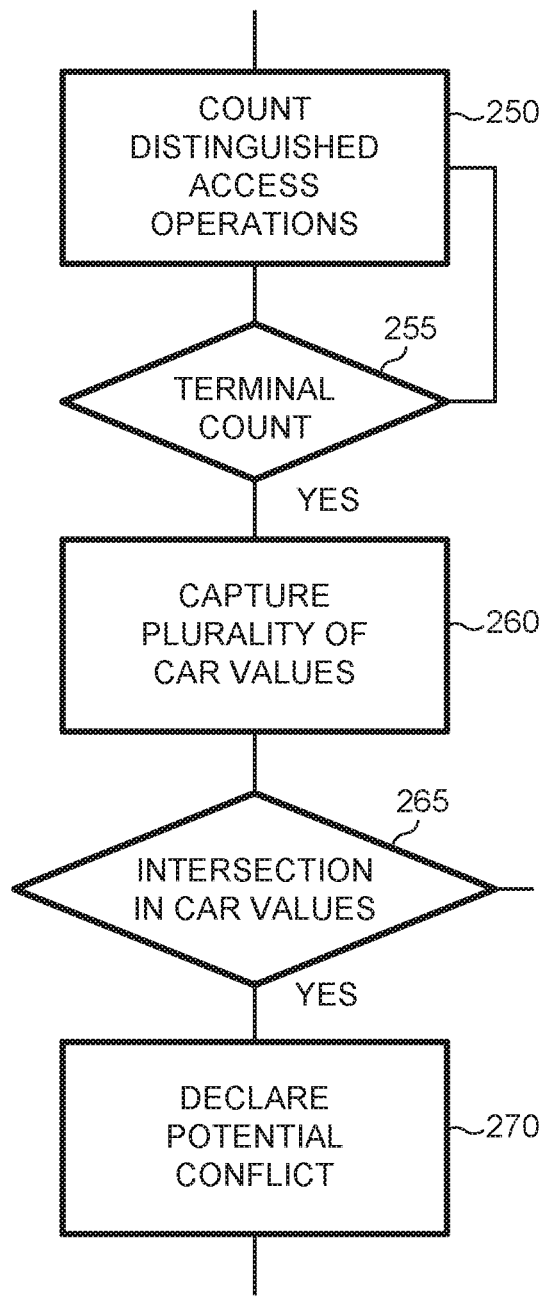
FIG. 9 is a flow diagram that depicts an alternative method for detecting an inter-thread memory conflicts based on the number of distinguished memory accesses that are included in a composite access record.

FIG. 9 is a flow diagram that depicts an alternative method for detecting an inter-thread memory conflicts based on the number of distinguished memory accesses that are included in a composite access record. Even though the present method, by its very nature, minimizes the potential for address aliasing, this alternative example method provides even further resistance to address aliasing. It should already be apparent that a common access record includes only addresses associated with distinguished memory accesses. Even still, there is a potential for address aliasing. In order to further minimize the potential for such address aliasing, this alternative example method uses a count of the number of memory addresses there are included in a common access record in order to determine when an inter-thread memory conflict detection should be performed. When address aliasing is not a major concern in a particular illustrative use case, then the terminal value for count is increased so as to reduce the frequency, and thereby the bandwidth necessary to support inter-thread conflict detection.

Accordingly, each time, and for each program thread executing in parallel, a counter is incremented each time a distinguished memory access occurs (step 250). Once a terminal count is reached (step 255) a plurality of composite access records are captured (step 260), wherein each such common access record is associated with a program thread that is executing in parallel with another. Should there be an intersection between the composite access records (step 265), a potential conflict is declared (step 270).

Figure 10:
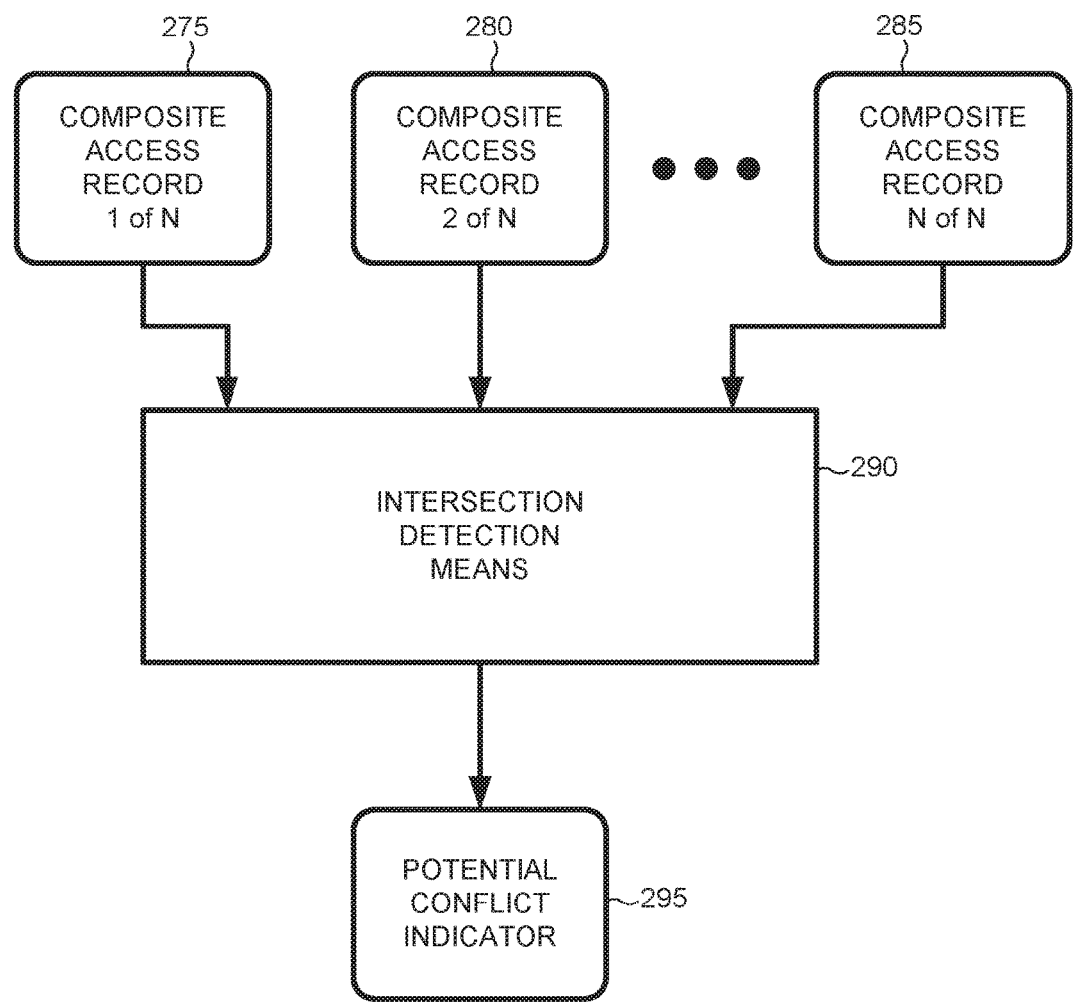
FIG. 10 is a pictorial diagram that represents one example method for identifying an inter-thread memory conflict.

FIG. 10 is a pictorial diagram that represents one example method for identifying an inter-thread memory conflict. According to various alternative methods, generation of a composite access record is one feature that distinguishes these alternative methods from the prior art. Again, a composite access record is based on addresses for only those memory operations that have a potential for a memory conflict.

Once a composite access record is created for a particular processing thread, this example method provides for identifying a potential memory conflict between two or more parallel threads. In this alternative method, a plurality of composite access records, 275, 280, 285, are received in an intersection detection means 290. A potential memory conflict indicator 295 is generated by the intersection detection means 290 based upon the plurality of composite access records received. The fact that this description includes only three CAR values that are subject to comparison is not intended to limit the scope of the claims appended hereto.

It should be appreciated that, according to various illustrative use cases, the composite access records may be generated at various locations in a parallel processing system. According to one illustrative use case, a composite access record is generated by a hardware component that is closely coupled to a processing core. In such applications of the present method, the hardware component that is closely coupled to a processing core will typically receive memory access information for all memory accesses conducted by a particular processing thread. However, the hardware component that is so closely coupled to a processing core typically includes a filtering mechanism in order to identify only those memory accesses that are "distinguished".

For such distinguished memory accesses, the associated memory address is used in the generation of the composite access record. By closely coupling the composite access record generator to a processing core, higher-speed transfers may be supported. This means that the overall performance of a memory channel may be preserved. Because the output of the hardware components that generate the composite access record is presented much less frequently, the path from a composite access record generator to an intersection detection means will typically require much less bandwidth. This is further discussed below.

Figure 11A:
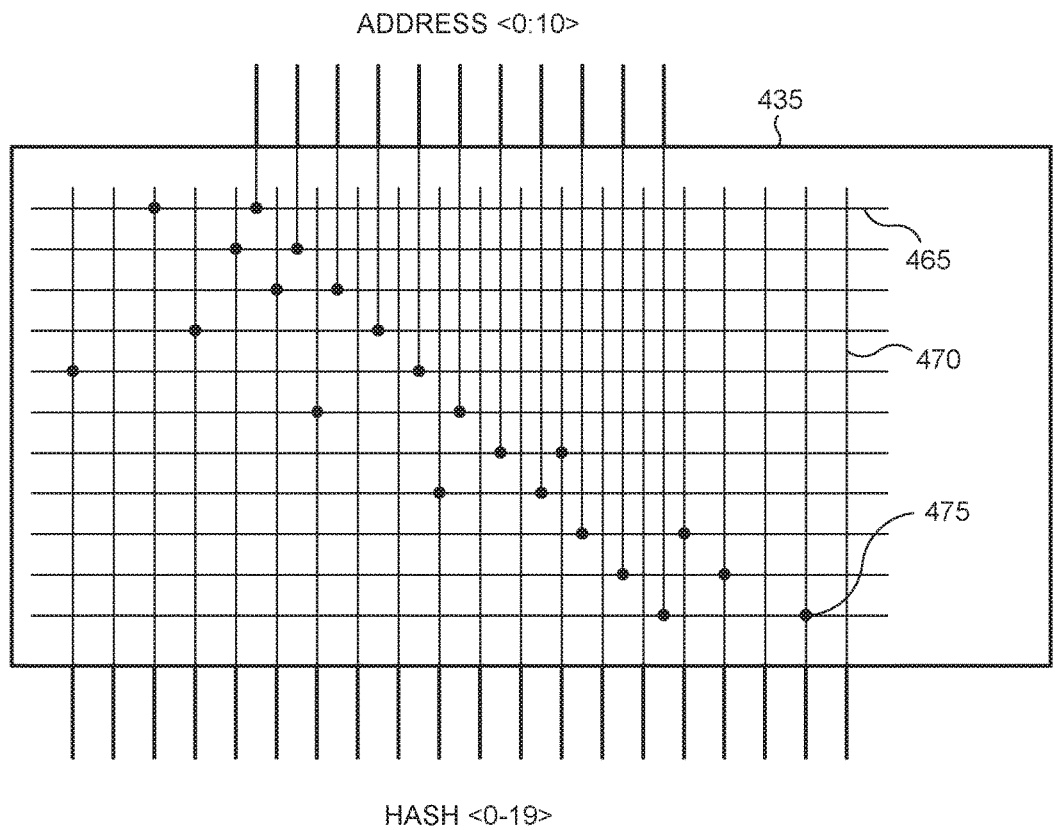
FIG. 11A is a pictorial diagram that depicts the operation of one example method for widening an input address.

FIG. 11A is a pictorial diagram that depicts the operation of one example method for widening an input address. According to this example method, an input address, e.g. address bits [0:10] are received. It should be appreciated that, according to this example method, the address bits corresponds to a memory location associated with a distinguished memory operation, where said distinguished memory operation has the potential for a memory conflict. In this particular example method, the input bits are routed to different output bits, e.g. hash-bit [0:19], as depicted in the figure. The size of the address is specified here as 11 bits in width is for discussion purposes only and is not intended to limit the scope of the claims appended hereto.

It should also be appreciated that, according to one alternative example method, the routing of a particular input bit to a particular hash-bit may be programmed, based on a priori knowledge of the potential for conflicts, to further minimize the potential for address aliasing. As such, when particular addresses are prone to conflict, the address bits of particular addresses may be routed to different outputs so as to minimize the potential for saturation of a composite access record.

According to one illustrative use case, this alternative example method for widening an input address is embodied in a programmable matrix. In such a programmable matrix 435, each input address has a corresponding horizontal connection runner 465. Accordingly, each output bit has a vertical connection runner 470. In order to route a particular input bit to a particular output bit, the vertical connection runner 470 of a particular output bit is connected to the horizontal connection runner 465 for a particular input bit. It should also be appreciated that for those output bits that are not connected to an input bit, those output bits shall be set to zero. In this illustrative use case, an input bit may be routed to a plurality of output bits. It should also be appreciated that, according to yet another alternative method, a plurality of such matrices are included so that different hash-bits are generated for different input addresses. This further reduces the potential for address aliasing and saturation of a composite access record.

Figure 11B:
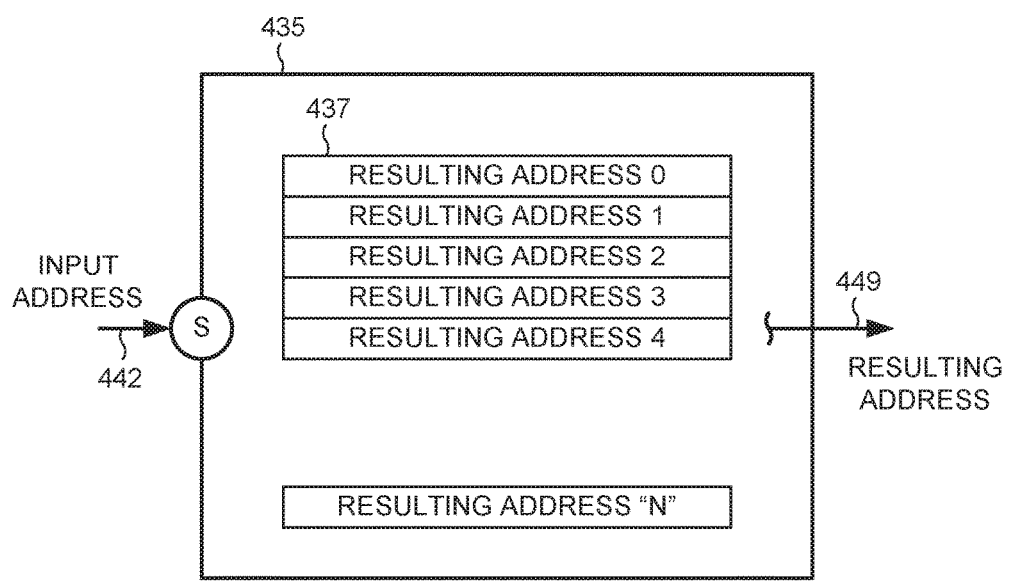
FIG. 11B is a pictorial representation of one example embodiment of a hash table.

FIG. 11B is a pictorial representation of one example embodiment of a hash table. According to several alternative example embodiments, a hash table 435 is embodied as a memory. Accordingly, this alternative embodiment of a hash table 435 stores a plurality of resulting addresses 437. Each location in the hash table (e.g. a programmable memory) 435 is programmed with a particular resulting address and is selected according to an input address 442. Once a particular resulting address 437 is selected according to the input address 442, it is provided as a resulting address 449. It should be appreciated that, in several alternative methods, the hash table 435 is programmed in a manner such that a resulting address for a particular input address 442 will not overlap with other input addresses on a bitwise level.

It should likewise be appreciated that, according to various alternative methods, the hash table 435 is programmable according to a particular program thread in order to achieve a minimal aliasing. The hash table 435, according to these various alternative methods, is programmed specifically for a particular parallel thread, or specifically for a plurality of such parallel threads that are executed in parallel by a collection of processing cores.

Figure 12:
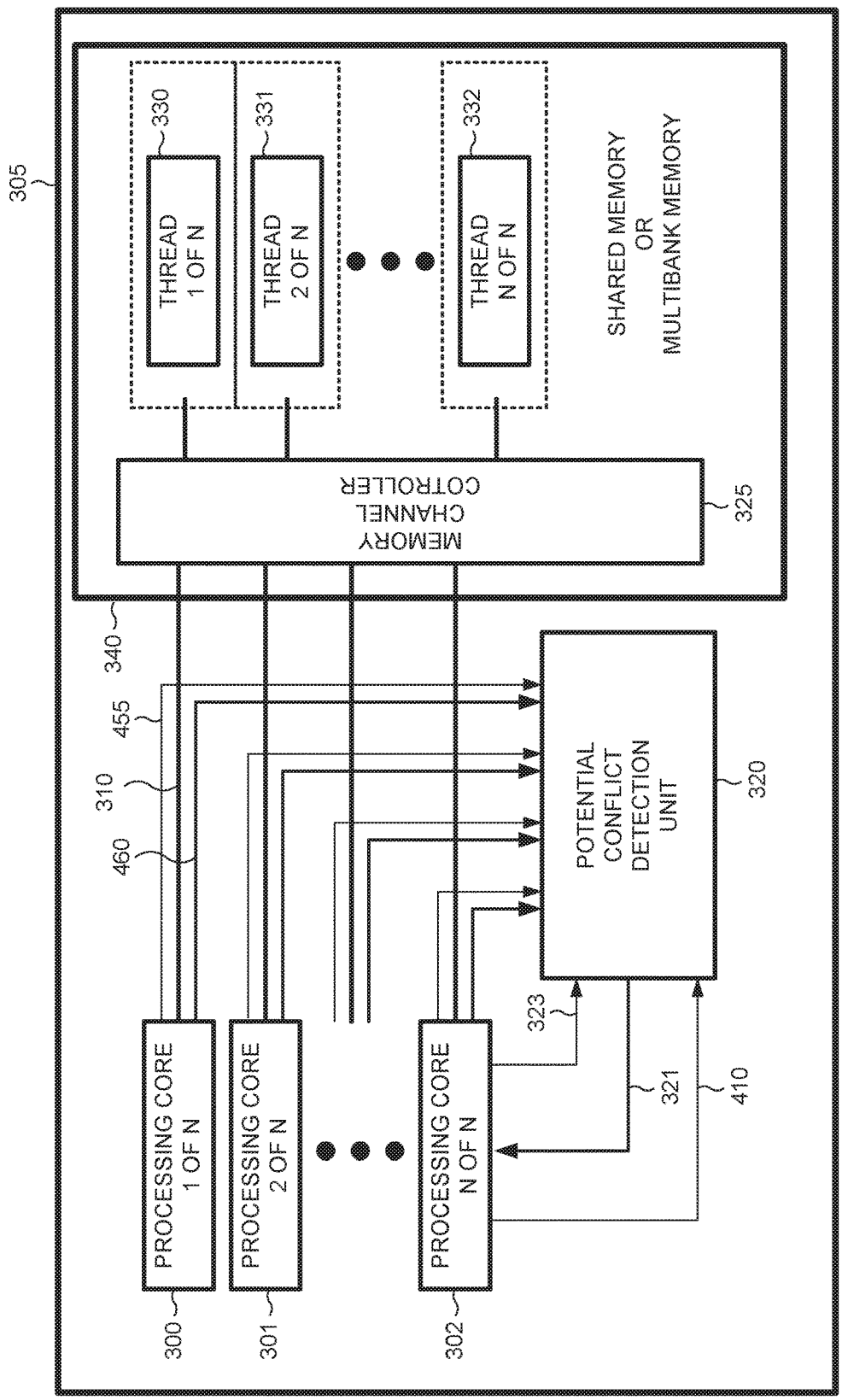
FIG. 12 is a block diagram of one example embodiment of a multithread processing engine that detects potential memory conflicts based on distinguished memory transactions.

FIG. 12 is a block diagram of one example embodiment of a multithread processing engine that detects potential memory conflicts based on distinguished memory transactions. As already discussed, generation of a composite access record that uses only the addresses of distinguished memory transactions is just one of several distinguishing characteristics of an apparatus described in the claims appended hereto. According to one example embodiment, a multi-thread processing engine 305 includes a plurality of processing cores, 300, 301, 302. Further included in this example embodiment is a potential conflict detection unit 320. It should be appreciated that the claims appended hereto are not intended to be limited in scope to any particular example of a multithread processing engine as depicted in the figures. For example, the figures depict a processing engine with three processing cores. This is merely for the sake of description and is not intended to limit the claims appended hereto.

It should be appreciated that, according to one alternative embodiment, the present apparatus includes a memory 340, which is used to store program sequences, e.g. parallel threads 330, 331, 332. It should be appreciated that the present apparatus does not necessarily include a memory, since a memory device may be added to form a substantially complete processing engine 305. Processing cores 300, 301, 302 are used to execute program sequences stored in a memory. Typically, these program sequences will be executed in parallel by a plurality of processing cores included in the claimed apparatus.

FIG. 12 illustrates that, according to this alternative example embodiment, a processing core 300, 301, 302 presents a composite access record 460 to the potential conflict detection unit 320. As such, each processing core within a multithread processing engine 305 presents a composite access record 460 that is generated according to memory addresses accessed by the processing core as it executes a particular parallel thread 330, 331, 332.

It should be further appreciated that, according to this example embodiment, the potential conflict detection unit 320 receives these composite access records from the plurality of processing cores 300, 301, 302 and generates a potential conflict signal 321. The potential conflict signal 321 is generated according to the composite access records received by the potential conflict detection unit 320 from the plurality of processing cores 300, 301, 302. Each processing core 300, 301, 302, when it receives the potential conflict signal 321, aborts parallel execution of a processing thread 330, 331, 332. In one alternative embodiment, the system 305 will begin execution of the program threads in a serial manner.

Figure 13:
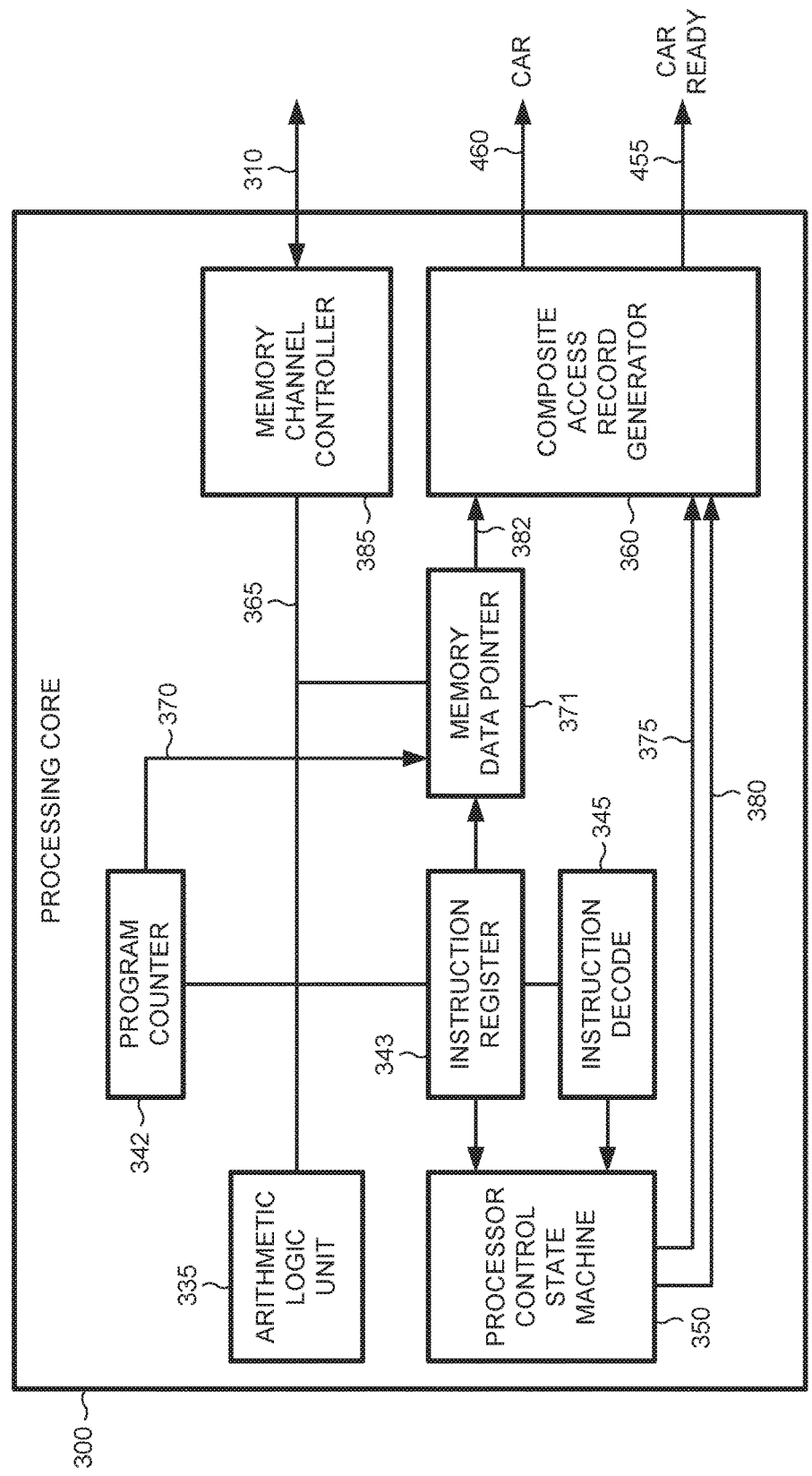
FIG. 13 is a block diagram that depicts the structure of one example embodiment of a processing core that includes a closely coupled composite access record generator.

FIG. 13 is a block diagram that depicts the structure of one example embodiment of a processing core that includes a closely coupled composite access record generator. It should be appreciated that, according to this example embodiment, each particular processing core 301, 302, 303 includes a composite access record generator 360 and an instruction decoder 345. According to this alternative example embodiment, the instruction decoder 345 includes circuitry for recognizing and decoding instructions for distinguished memory transactions. According to various other alternative embodiments, the processing core 300 further includes an arithmetic logic unit 335, which is used to perform arithmetic functions as the processing core 300 executes program operations stored in a memory. Other aspects of how such a processing core operates are well understood within the art of processor architectures and, for the sake of brevity, are not discussed further.

In this alternative example embodiment, a program counter 342, included in some alternative example embodiments of the present apparatus, provides an address 370 for an operation included in a parallel program thread 330, 331, 332. As the present apparatus operates, an address stored in the program counter 370 is directed to a memory data pointer 371. As the present apparatus continues to operate, the memory data pointer 371 interacts with the memory channel controller 385 using an internal bus 365. The memory channel controller 385 is then used to fetch an operation code from a memory, e.g. the ad-on memory 340 shown in FIG. 12. In some example embodiments, the operation code comprises an instruction that may be decoded by the instruction decoder 345.

Although not strictly necessary, the present apparatus is described along with a memory channel interface to a transactional memory subsystem 340. As seen in FIG. 12, the transactional memory subsystem 340 includes a memory channel controller 325. In some example embodiments, the memory subsystem 340 comprises a shared memory. In other example embodiments, the memory comprises a multibank memory. When a multibank memory is included in the transactional memory subsystem 340, each processing thread 330, 331, 332 uses a different memory bank so that simultaneous access to memory may be achieved in support of greater processing throughput. It should likewise be appreciated that each thread includes at least one of operational codes (e.g. instructions) and data. The data stored in the memory 340 subsystem includes data stored in at least one of memory locations that are susceptible to conflict and memory locations that are not susceptible to conflict.

Once the memory channel controller 325 retrieves from the memory 340 an operational code (e.g. instruction), the operational code is then stored in the instruction register 343. It should be noted that the memory channel controller 325 is communicatively coupled with the instruction register 343 by means of the bus 365. The output of the instruction register, according to various alternative embodiments, may be bifurcated. In one embodiment, part of the instruction register 343 output is directed to a processor control state machine 350. Such a process control state machine 350 is included in several various alternative embodiments of the present apparatus.

Part of the instruction register 343 output, according to one alternative embodiment, is directed to an instruction decode table 345. The instruction decode table 345 is programmed to identify several instructions peculiar to a processing core 300 as defined herein. According to one example embodiment, the instruction decode table 345 is programmed to recognize distinguished memory transactions, as further discussed below.

According to one alternative example embodiment, the processor control state machine 350 generates a composite access record (CAR) update signal 375 when the instruction decode 345 identifies a distinguished memory transaction. In response to the CAR update signal, the composite access record generator 360 will capture an address from the memory data pointer 371. It should also be appreciated that, according to this alternative embodiment, the memory data pointer 371 is loaded with the address of a particular location in memory using control signals provided by the processor control state machine 350.

It should be appreciated that the processor control state machine 350 orchestrates such loading of the memory data pointer 371 when it recognizes, according to the content of the instruction register 343 and the output of the instruction decode 345, that a distinguished memory transaction is to be conducted. It should be appreciated that such manipulation and movement of memory pointers will vary from embodiment to embodiment. Any example embodiment herein described is not intended to limit the scope of the claims appended hereto and is presented merely to describe one illustrative use case that embodies the methods and techniques taught herein.

The CAR generator 360, which in this embodiment is integrated into the processing core, creates a composite access record 460 based on the address it captures from the memory data pointer 371. When a composite access record is ready, the CAR generator will generate a CAR ready signal 455.

FIG. 12 further illustrates that each processing core 300, 301, 302 included in the multithread processing engine 305 provides to the potential conflict detection unit 320 a composite access record 460 and a CAR ready signal 455. To further clarify the operation of the multithread processing engine 305, each processing core also includes an interface to a memory transaction channel 310, which enables each processing core 300, 301, 302 to interact with the memory subsystem 340.

Again, as already described, the memory subsystem 340, according to at least one alternative embodiment, comprises a transactional memory subsystem. Accordingly, the memory transaction channel 310 serves as the means for communicating memory transaction messages from a processing core 300 to the transactional memory subsystem 340. The transactional memory subsystem 340, according to yet another alternative embodiment, further includes a memory channel controller 325, which receives memory transaction requests from the processing core 300 and manages the contents of memory according to such transaction requests.

Figure 14:
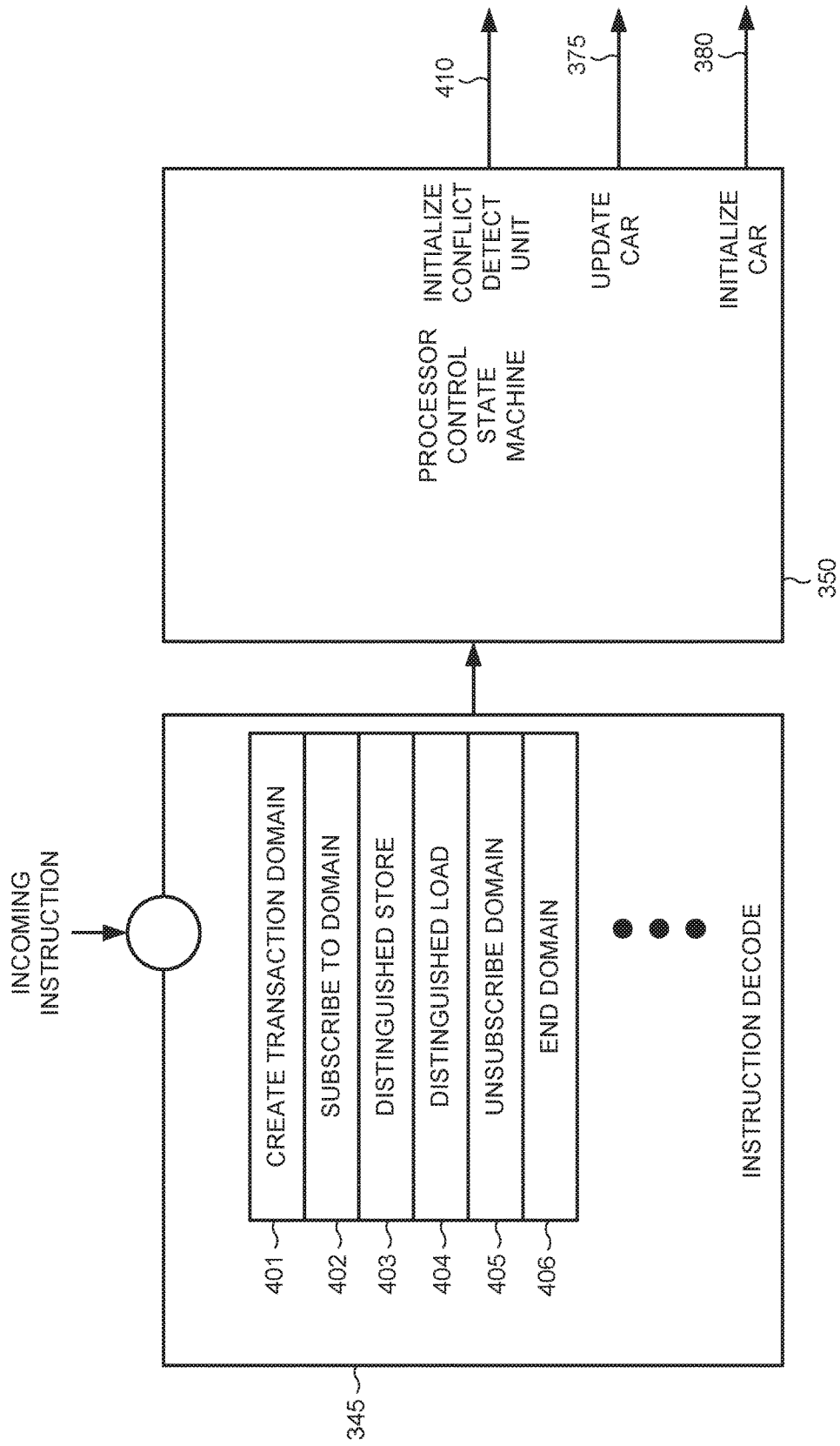
FIG. 14 is a block diagram that shows the interaction of an instruction decode table and a processor control state machine in one example embodiment of a processing core.

FIG. 14 is a block diagram that shows the interaction of an instruction decode table and a processor control state machine in one example embodiment of a processing core.

As already described, the instruction decode table 345 includes entries for various instructions that are peculiar to a multithread processing engine as herein described. According to one example embodiment, the instruction decode table 345 includes an entry for at least one of a "distinguished store" operation 403 and a "distinguished load" operation 404.

The "distinguished store" operation 403 and the "distinguished load" operation 404 are considered to be operations for recognizing a distinguished memory operation. When such a distinguished memory operations is recognized by the processor control state machine 350, the processor control state machine 350, of one alternative embodiment, generates a CAR update signal 375.

In yet another alternative example embodiment, the instruction decode table 345 includes an entry for a "create transaction domain" operation 401. When the processor control state machine 350 recognizes a "create transaction domain" operation, the processor control state machine 350 then generates an initialize potential conflict detect unit signal 410. The initialize potential conflict detect unit signal 410 is directed to the potential conflict detection unit 320. It should be appreciated that the potential conflict detection unit 320 will then initialize itself in preparation for a new transaction domain as heretofore discussed.

As discussed previously, it is necessary to associate particular processing cores with a transaction domain. According to this alternative embodiment of a multithread processing engine, this occurs when a processing core executes the "subscribe transaction domain" operation. According to one alternative embodiment, the "subscribe transaction domain" operation allows a processing core to control the potential conflict detector unit 320 in order to cause the potential conflict detector unit 320 to either ignore or to include composite access records generated by particular processing cores as it works to identify potential conflicts.

According to one alternative example embodiment, the binary operational code associated with the "create transaction domain" operation includes binary flags in an associated operand that correspond to particular processing cores in the system. When such a flag is asserted, the corresponding processing core is identified with the created transaction domain and composite access records generated by that processing core are included by the potential conflict detector 320 as it operates to detect potential inter-thread memory access conflicts. These flags 323 are directed to the potential conflict detect unit 320.

In yet another alternative example embodiment, the instruction decode table 345 includes an entry for a "subscribe to domain" operation 402. When the processor control state machine 350 recognizes the "subscribe to domain" operation 402, it asserts the initialize CAR signal 380. In operation, the initialize CAR signal 380 causes a composite access record generator 360 to initialize and also clears any former composite access records stored therein.

In yet another alternative example embodiment, the instruction decode table 345 includes an entry for at least one of an "unsubscribe domain" operation 405 and an "end domain" operation 408. When the "unsubscribe domain" operation 405 is conducted by a processing core, then that particular processing core is excluded from consideration when the potential conflict detect unit 320 compares composite access records from a plurality of processing cores 300, 301, 302. When a processing core conducts an "end domain" operation 408, then all hardware associated with a particular transaction domain is reset and made available for subsequent use.

Figure 15:
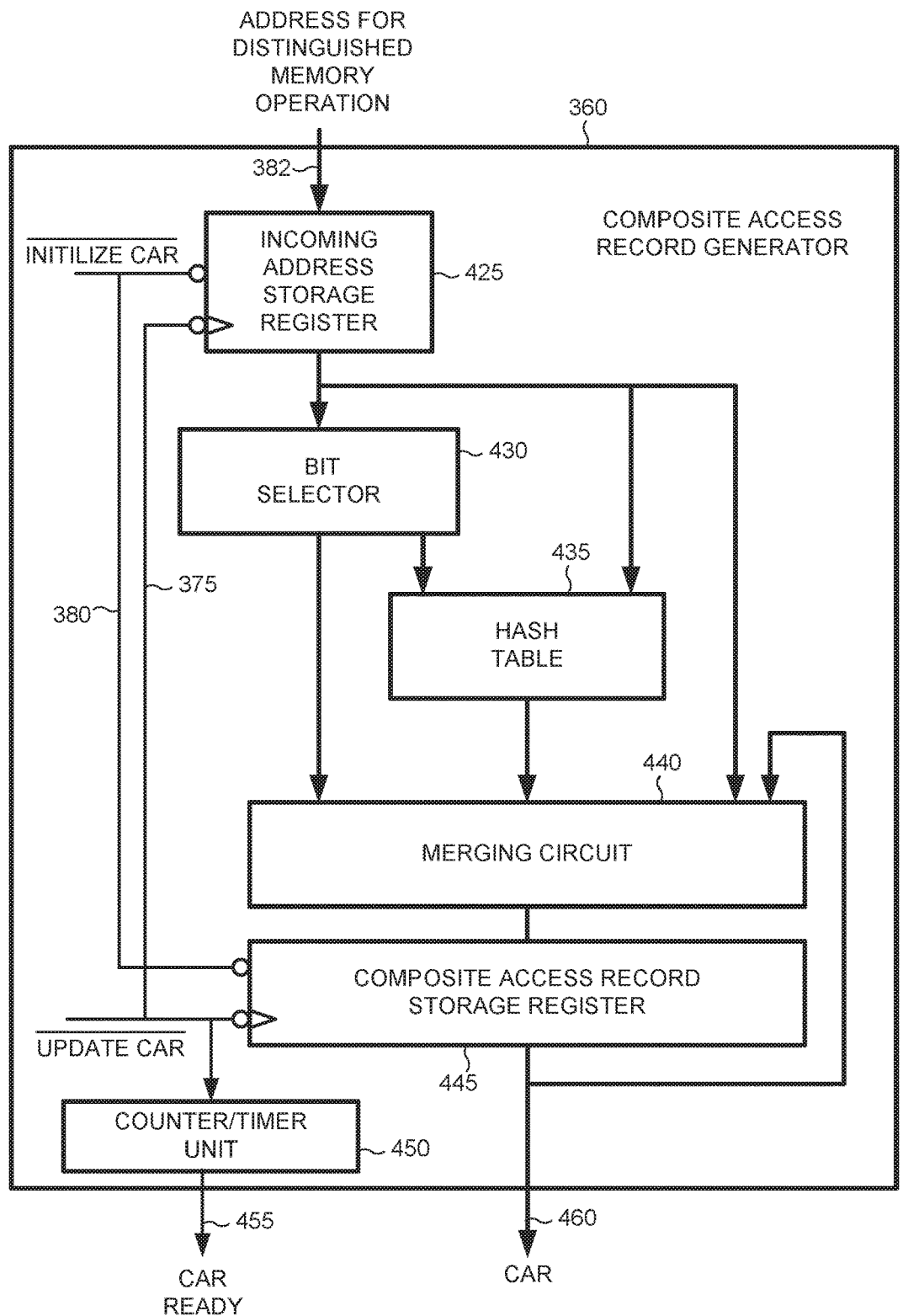
FIG. 15 is a block diagram that depicts one example alternative embodiment of a composite access record generator.

FIG. 15 is a block diagram that depicts one example alternative embodiment of a composite access record generator. According to this alternative example embodiment, a composite access record generator 360 includes a bit selector 430. The bit selector 430 receives an address and selects a portion of that address. It should be appreciated that according to one alternative example embodiment, an address for a distinguished memory operation is received 382 and stored in an incoming address storage register 425. Then, the stored address is used throughout the CAR generator 360 in lieu of the received address.

As depicted in the figure, the output of the bit selector 430 is directed to a merging circuit 440, which is also included in this example alternative embodiment of a composite access record generator 360. In yet another alternative embodiment, the output of the bit selector 430 is directed to a hash table 435. The hash table 435 is included in this alternative example embodiment of the composite access record generator 360. The hash table 435, according to another alternative embodiment, alternatively receives the entire address as an input. The output of the hash table 435 is directed to a merging circuit 440, which is included in this alternative example embodiment of the composite access record generator 360. The merging circuit 440, in an alternative example embodiment, alternatively receives the entire address as an input.

It should be appreciated that the merging circuit 440, according to various alternative embodiments, receives as a first input at least one of the output of the bit selector 430, the output of the hash table 435, and the address directly received 382 by the composite access record generator 360 (e.g. the latched version stored in the incoming address storage register 425). Again, it is important to note that in some embodiments, the address received 382 is stored in an incoming address storage register 425 before it is disseminated to either the bit selector 430, to the hash table 435 or the merging circuit 440.

As already discussed, the merging circuit includes a second input, which in this alternative example embodiment receives a current composite access record as stored in a composite access record storage register 445. In operation, the composite access record storage register 445 is used to store a current value of the composite access record 460. That current composite access record 460 is merged by the merging circuit 440 with at least one of the output of the bit selector 430, the output of the hash table 435 and the address received by the composite access record generator 360.

Further clarifying the operation of this example embodiment of a composite access record generator 360, composite access record generator 360 is responsive to an initialize CAR signal 380. The initialize CAR signal 380 is used to clear the incoming address storage register 425 and the composite access record storage register 445. Composite access record generator 360 also receives an update CAR signal 375. In one alternative example embodiment, the update CAR signal is used to latch an address into the incoming address storage register 425. Substantially contemporaneous therewith, the update CAR signal is used to store the output of the merging circuit 440 into the composite access record storage register 445.

It should be appreciated that once a new address is latched into the incoming address storage register 425, that value is propagated through the combinatorial logic that includes the bit selector 430, the hash table 435 and the merging circuit 440. On the subsequent assertion of the update CAR signal, the fully propagated output of the merging circuit 440 is stored in the composite access record stores generator 445.

In yet another alternative example embodiment, a counter/timer unit 450 is also included in the composite access record generator 360. When operating as a counter, the counter/timer unit 450 receives the update CAR signal and counts the number of times the update CAR signal is asserted. The update CAR signal is asserted for each incoming address 382, and hence reflects the number of distinguished memory operations that have occurred since the counter/timer 450 was reset. In this alternative embodiment, the counter/timer unit 450 is also reset using the initialize CAR signal. When the counter/timer 450 reaches a terminal count value, it asserts a CAR ready signal 455. The CAR ready signal 455 provides indication to the potential conflict detection unit 320 that a CAR value is ready for use in potential conflict detection.

The counter/timer 450 is also capable of operating as a timer. In this operating mode, the timer is initiated by the initialize CAR signal. When in timer mode, the timer will then generate a CAR ready signal 455 on a periodic basis. Each time the CAR ready signal is asserted, the potential conflict detector unit 320 will receive a CAR value 460 from the composite access record generator 360 and perform a potential conflict detection by comparing composite access records from a plurality of composite access record generator 360. This allows for repeated and time deterministic checking for potential inter-thread memory conflicts.

Figure 16:
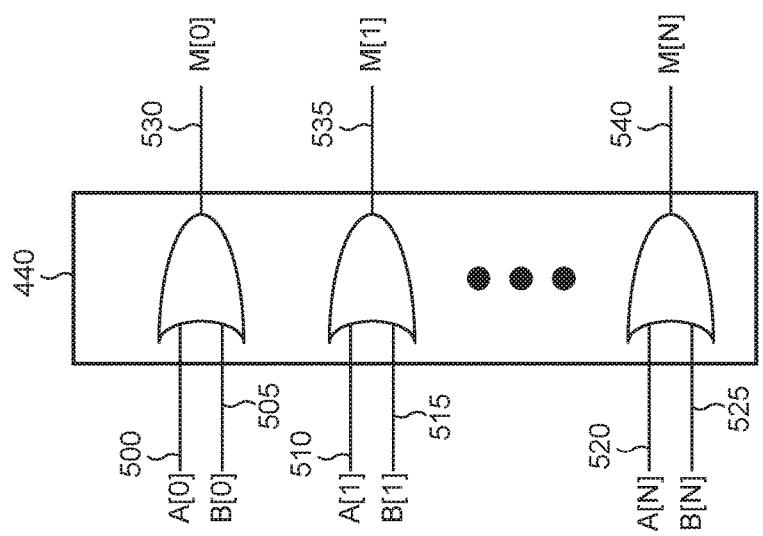
FIG. 16 is a logic diagram that depicts one example embodiment of a merging unit.

FIG. 16 is a logic diagram that depicts one example embodiment of a merging unit. According to this example embodiment of a merging unit 440, the merging unit includes a plurality of OR gates which are structured to receive a first set of inputs ("A") and a second set of inputs ("B"). A first OR gate accommodates a first bit from the first input A[0] (500) and a first bit from the second input B[0] (505) and generates a logical OR M[0] (530), where M is for "merged". A second OR gate receives a second bit from the first input A[1] (510) and a second bit from a second input B[1] (515) and generates therefrom a second merged bit M[1] (535). It should be appreciated that the number of OR gates included in the merging unit 440 varies with the width of the composite access record 460 generated by the composite access record generator 360. Accordingly, a last OR gate is used to merge bit "N" for a first input A[N] (520) and second input B[N] (525) to generate an "N" merged output bit M[N](540).

Figure 17:
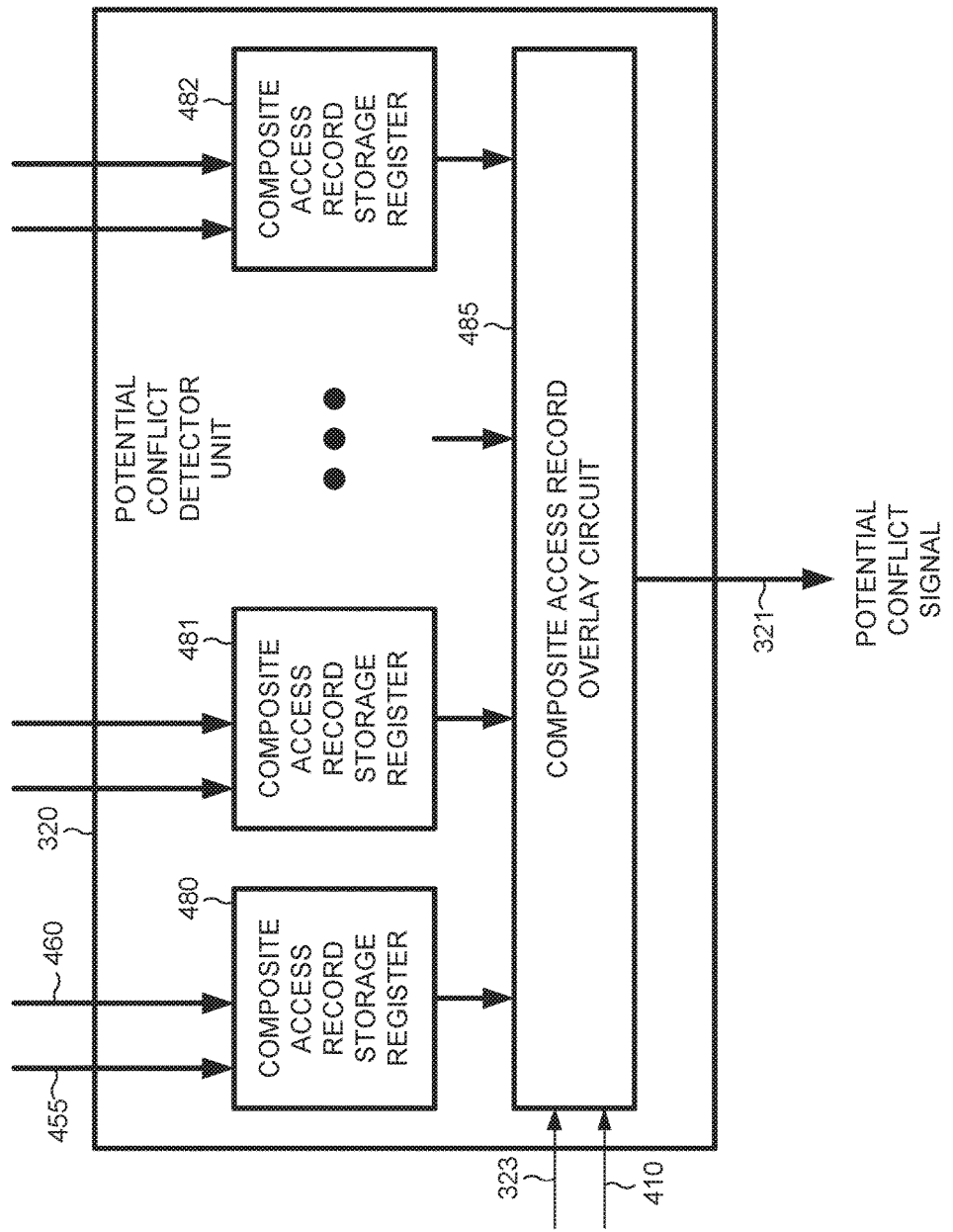
FIG. 17 is a block diagram that depicts one example embodiment of a potential conflict detector unit.

FIG. 17 is a block diagram that depicts one example embodiment of a potential conflict detector unit. In this example embodiment, a potential conflict detector unit 320 includes a plurality of composite access record storage registers 480, 481, 482. A composite access record storage register 480 accepts a composite access record 460 from a corresponding composite access record generator 360. The composite access record storage register 480 accepts a composite access record 460 when the CAR ready signal 455 is asserted. It should be appreciated that the CAR generator 360 clears its internal composite access record storage register 445 whenever the potential conflict detector unit 320 accepts a CAR value into its storage register 480.

The outputs of the plurality of composite access record storage registers 480, 481, 482 are directed to a composite access record overlay circuit 485. The composite access record overlay circuit 485 develops a potential conflict signal 321 by comparing the composite access records it receives from the plurality of composite access record storage registers 480, 481, 482. In essence, the composite access record overlay circuit, according to one alternative embodiment, performs a bitwise comparison of all of the composite access records it receives from the composite access record storage registers 480, 481, 482. According to one alternative example embodiment, the composite access record overlay circuit 485 receives a set of flags 323 which it uses to ignore particular composite access records as it attempts to identify a potential inter-thread memory conflict.

According to yet another alternative embodiment, the composite access record overlay circuit 485 is also responsive to a potential conflict detector unit initialize signal 410. When the initialize signal 410 is asserted, the composite access record overlay circuit 485 clears a potential conflict signal 321 and any storage used to identify potential inter-thread memory conflict, including the composite access record storage registers 480, 481, 482.

Figure 18:
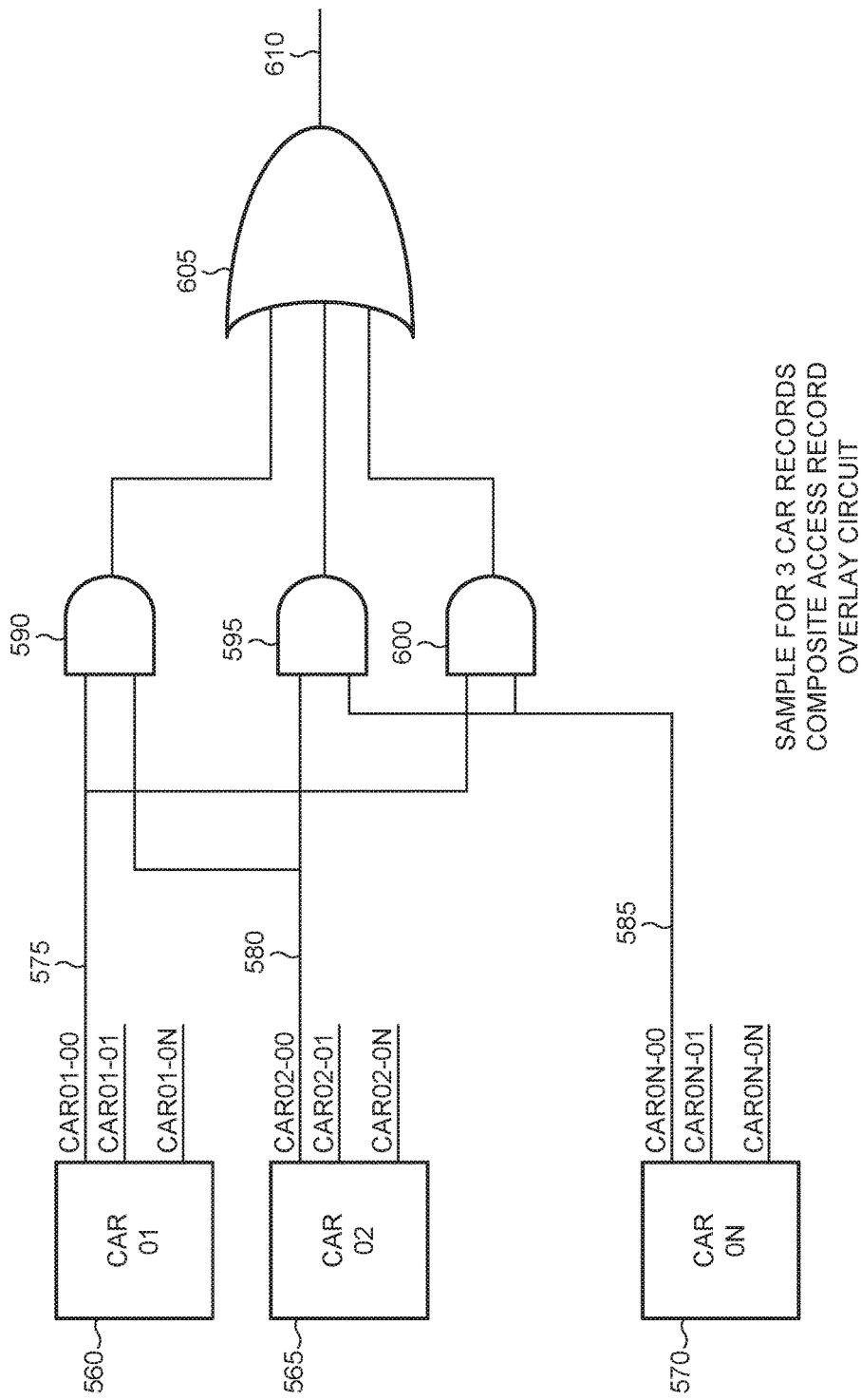
FIG. 18 is a block diagram that depicts one example embodiment of a composite access record overlay circuit.

FIG. 18 is a block diagram that depicts one example embodiment of a composite access record overlay circuit. According to this alternative example embodiment, a composite access record overlay circuit comprises a collection of AND-Gates (590, 595, 600). It should be appreciated that the quantity of AND-Gates is driven by the width of a composite access record.

For the example depicted in the figure, there are three composite access records, each of which is stored in a CAR register (560, 565, 570). It should be appreciated that the quantity of access records is not intended to limit the scope of the claims appended hereto. The composite access record overlay circuit functions to detect a potential conflict by determining if the same bit in any two CARs are set. Hence, the figure depicts that bit <00> 575 in CAR-1 560 is "AND-ed" with each other bit <00>, in this case bit<00> 580 of CAR-2 and bit<00> of CAR-N 585. It is important to note that bit<00> 580 of CAR-2 is also "AND-ed" with it<00> of CAR-N 585.

Hence, this simple example is extended with 3 more AND-Gates for each bit in the composite access records. The results of all AND-Gates are then subject to an OR-Gate 605 so that any one of the AND-Gate outputs is recognized as a potential conflict detect. The output of the OR-Gate 605, which has an input for each AND-Gate for each bit in the CARs, then results in the potential conflict detect signal 610.

Figure 19:
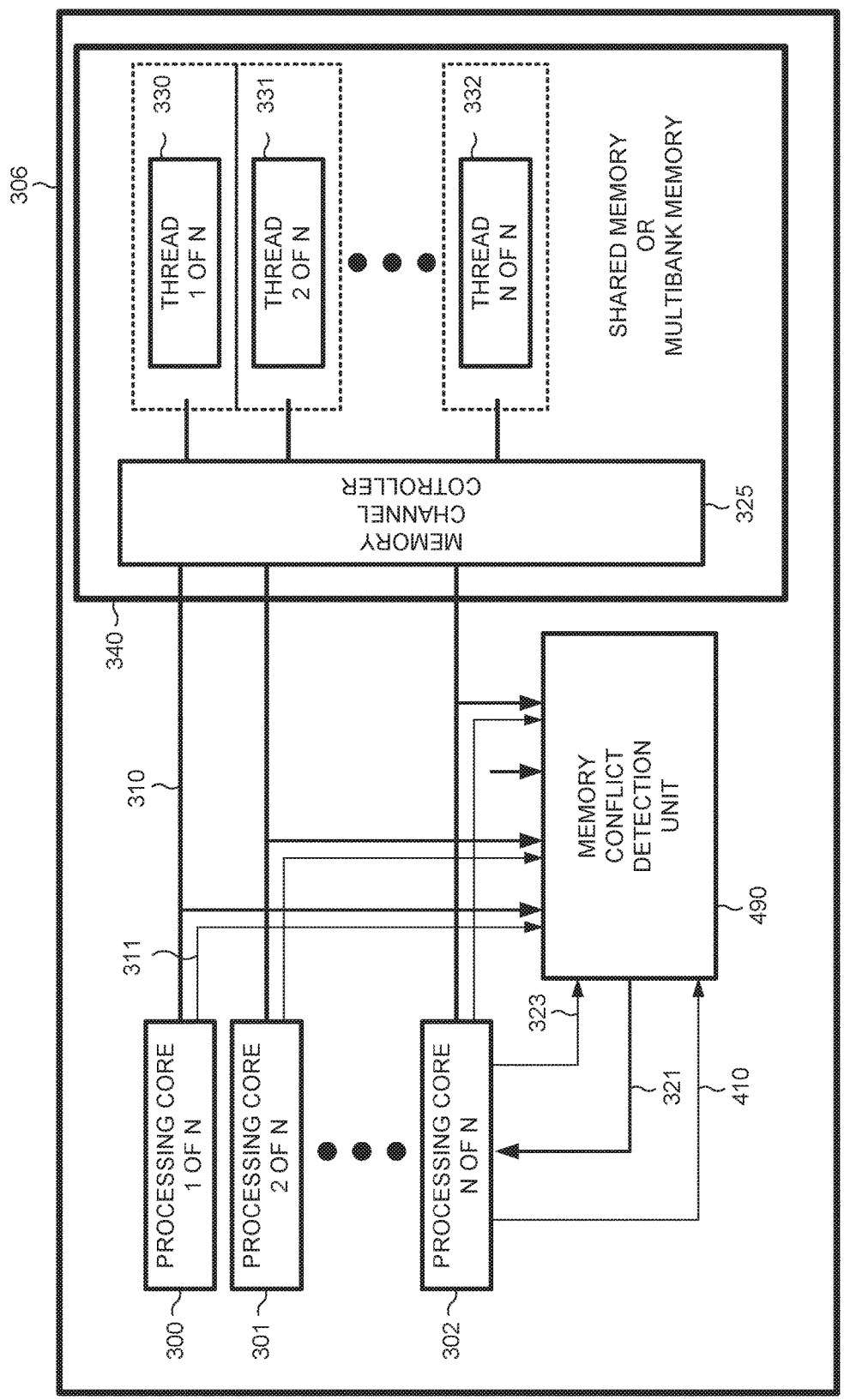
FIG. 19 is a block diagram that depicts a multithread processing engine that uses a central memory conflict detection unit.

FIG. 19 is a block diagram that depicts a multithread processing engine that uses a central memory conflict detection unit. In this example embodiment, the multithread processing engine 306 includes a plurality of processing cores 300, 301, 302. Each of these processing cores uses an independent memory channel 310 in order to access a memory subsystem 340, which is included in some alternative embodiments of a multithread processing engine 306. This alternative example embodiment of a multithread processing engine 306, as noted above, includes a central memory conflict detection unit 490.

The central memory conflict detection unit 490 comprises interfaces for a plurality of memory transaction channels 310. It should be appreciated that each processing core 300, 301, 302 includes an interface to an independent memory transaction channel 310 in order to communicate with the memory subsystem 340. Much akin to the formerly described multithread processing engine that uses closely coupled composite access record generators, the present multithread processing engine 306 may use a shared memory or a multibank memory. In a typical application, the memory subsystem 340 comprises a transactional memory subsystem that includes a memory channel controller 325 as heretofore described.

Figure 20:
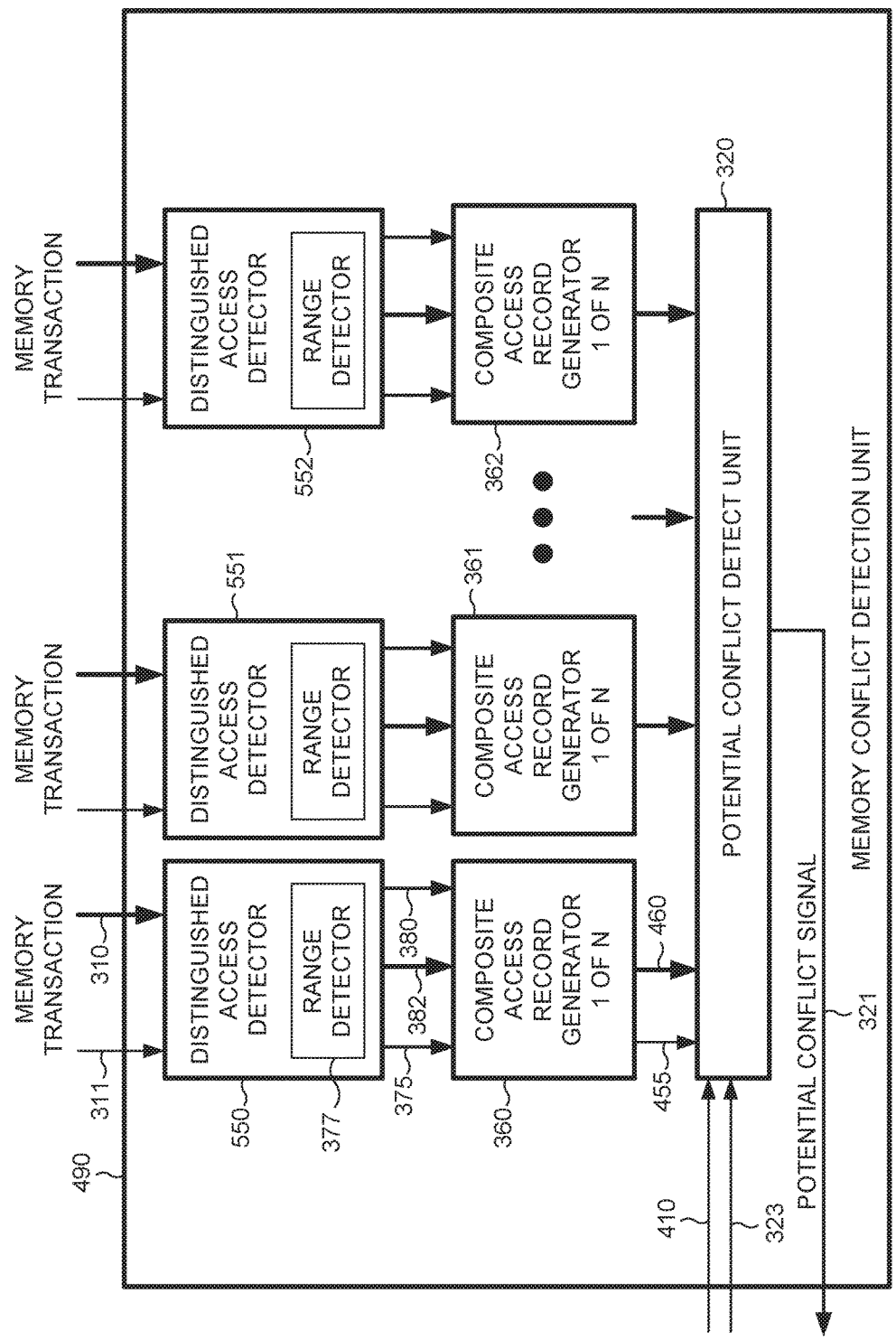
FIG. 20 is a block diagram of one example embodiment of a memory conflict detection unit.

FIG. 20 is a block diagram of one example embodiment of a memory conflict detection unit. According to this example embodiment, a memory conflict detection unit 490 includes a plurality of distinguished access detectors 550, 551, 552 and a plurality of composite access record generators 360, 361, 362. Each composite access record generator 360, 361, 362 creates a composite access record 460 according to memory addresses 382 received from a corresponding distinguished access detector 550, 551, 552. It should be noted that, even though the present embodiment is described using a quantity of three processing cores and associated memory conflict detection hardware, this is merely for the sake of convenience and is not intended to limit the scope of the claims appended hereto.

It is also important to understand that, according to this example alternative embodiment, the composite access record generators 360, 361, 362 and a potential conflict detection unit 320, which is also included in this example embodiment of a memory conflict detection unit 490, operate in a manner substantially the same as heretofore previously described. Also, the internal structure of the composite access record generators 360, 361, 362 and the potential conflict detection unit 320 are substantially similar to those heretofore described.

In operation, the composite access record generators 360, 361, 362 here still receive an address 382 that is associated with a distinguished memory operation. The received address is latched into the composite access record generators using corresponding update CAR signals 375, which in this embodiment are generated by the distinguished access detectors 550, 551, 552. A composite access record 460 is received by the potential conflict detector unit 320 when a CAR ready signal 455 is asserted. The potential conflict detector unit 320 develops a potential conflict signal 321 based upon a plurality of composite access records 460 that it receives from the plurality of composite access record generators 360, 361, 362. The potential conflict signal 321 is directed to the plurality of processing cores in order to indicate that a potential inter-thread memory conflict has occurred.

In this example embodiment, the composite access record generators 360, 361, 362 are also initialized by initialize CAR signals 380, which, in this example alternative embodiment, are also generated by the distinguished access detectors 550, 551, 552. The potential conflict detector unit 320 is responsive to a set of flags 323 in order to exclude composite access records associated with particular processing cores. The potential conflict detector unit 320 is also responsive to an initialize signal 410.

In this alternative example embodiment of a multithread processing engine 306, the distinguished access detectors 550, 551, 552 included in the memory conflict detection unit comprise interfaces for monitoring a memory transaction channel 310. A distinguished access detector 550 extracts an address from a memory access transaction that it perceives on the memory transaction channel 310 that is coupled to a particular processing core. The distinguished access detector 550, according to one alternative example embodiment, includes a range detector 377. The range detector is programmed by a processing core in order to identify a range of addresses that are potentially susceptible to inter-thread memory conflicts. The distinguished access detector 550 operates to subject an address that it extracts from a memory access transaction to the address range specified in the range detector 377.

When an extracted address is found to fall within the range specified in the range detector 377, that address is passed along 382 to a corresponding composite access record generator 360. The composite access record generator 360 accepts this address when the update CAR signal 375 is asserted by the distinguished access detector 550. As already described above, the update CAR signal 375 also causes the address to be included in a composite access record 460 generated by the composite access record generator 360.

In yet another alternative example embodiment, the distinguished access detector 550 receives a distinguished access signal 311 from a corresponding processing core. The distinguished access signal 311 causes the distinguished access detector 552 to extract an address from a memory transaction, which it perceives by way of its included memory transaction channel 310 interface, and to consider this extracted address as an address associated with a distinguished memory operation. Accordingly, the distinguished access detector 552 submits the extracted address 382 to a corresponding composite access record generator 360 so that the extracted address may be incorporated into a composite access record according to the techniques and teachings of the disclosed example methods and variations thereof.

While the present method and apparatus has been described in terms of several alternative and exemplary embodiments, it is contemplated that alternatives, modifications, permutations, and equivalents thereof will become apparent to those skilled in the art upon a reading of the specification and study of the drawings. It is therefore intended that the true spirit and scope of the claims appended hereto include all such alternatives, modifications, permutations, and equivalents.

What is claimed is:

1. A method for determining conflicts in parallel computing comprising:
   executing at least two parallel threads, wherein the parallel threads include memory access operations that are distinguished by the their potential for conflict;
   receiving a first address for a distinguished memory operation resulting from execution of a first parallel thread, said memory operation being associated with a distinguished instruction included in the first parallel thread;
   creating a first composite access record according to the received addresses for the first parallel thread;
   reducing the potential for saturation of the first composite access record by excluding therefrom address associated with a non-distinguished instruction included in the first parallel thread;
   receiving a second address for a distinguished memory operation resulting from execution of a second parallel thread, said memory operation being associated with a distinguished instruction included in the second parallel thread;
   creating a second composite access record according to the received addresses for the second parallel thread;
   reducing the potential for saturation of the second composite access record by excluding therefrom address associated with a non-distinguished instruction included in the second parallel thread;
   and
   declaring a potential conflict when the first and second composite access records overlap.

2. The method of claim 1 further comprising aborting parallel execution when a potential conflict is declared.

3. The method of claim 2 further comprising executing in a sequential manner the aborted parallel threads.

4. The method of claim 1 wherein executing a parallel thread comprises:
  executing a domain subscription operation;
  executing at least one of a distinguished load operation and a distinguished store operation; and
  executing a domain unsubscribe operation.

5. The method of claim 1 wherein creating a first composite access record comprises:
  receiving a first address;
  receiving a second address; and
  merging a differentiating portion of the second address with a differentiating portion of the first address.

6. The method of claim 1 wherein creating a first composite access record comprises:
  receiving an address; and
  merging a differentiating portion of the address with a prior first composite access record.

7. The method of claim 1 wherein creating a first composite access record comprises:
  receiving a first address;
  receiving a second address; and
  creating a union of a differentiating portion of the first address and a differentiating portion the second address.

8. The method of claim 1 wherein creating a first composite access record comprises:
  receiving an address;
  selecting a resulting address according to the received address; and
  merging a differentiating portion of the resulting address with a prior first composite access record.

9. The method of claim 1 wherein declaring a potential conflict comprises:
  receiving a first composite access record for a first thread on a first periodic basis;
  receiving a second composite access record for a second thread on a second periodic basis; and
  declaring a potential conflict when there is an intersection between the first and second composite access records.

10. The method of claim 1 wherein declaring a potential conflict comprises:
  counting the number of distinguished access operations occurring in a parallel thread;
  capturing a plurality of composite access records for corresponding parallel threads when the count reached a pre-established value; and
  declaring a potential conflict when there is an intersection between any of the plurality of captured composite access records.

11. A multithread processing engine comprising:
  plurality of processing cores, wherein each processing core comprises:
    instruction decoder, said instruction decoder including instruction decodes for recognizing a distinguished memory transaction; and
    composite access record generator that receives an address for a distinguished memory transaction recognized by the instruction decoder and generates a composite access record therefrom; and
  potential conflict detection unit that generates a potential conflict signal by comparing a plurality of composite access records received from the composite access record generators included in each of the processing cores and wherein potential conflict detection unit is communicatively coupled to each of the composite access record generator included in the plurality of processing cores.

12. The multithread processing engine of claim 11 wherein the instruction decoder comprises:
  instruction input for receiving an instruction;
  control signal lookup table including at least one of a create transaction domain entry, a subscribe to domain entry, an unsubscribe domain entry, an end domain entry, a distinguished load entry, and a distinguished store entry; and
  control signal outputs that include:
    initialize conflict detection unit signal that is active when the create transaction domain entry is selected by a received instruction initialize composite access record signal that is active when the subscribe to domain entry is selected by a received instruction; and
    update composite access record signal that is active when either the distinguished load entry or the distinguished store entry is selected by a received instruction.

13. The multithread processing engine of claim 11 wherein the composite access record generator comprises:
  bit selector for selecting a subset of received address bits for a memory transaction;
  hash table that stores one or more resulting addresses and which outputs one of said resulting addresses based on at least one of a subset of address bits received from the bit selector and the address presented to the bit selector;
  composite access record storage unit that stores a composite access record when a update signal is received;
  merging unit that combines the composite access record stored in the composite access record storage unit with at least one of the received address bits, a resulting address output by the hash table and a subset of the received address bits output by the bit selector.

14. The multithread processing engine of claim 11 wherein composite access record generator further includes a counter that is updated each time a distinguished memory transaction is recognized and generates a ready signal when the counter reaches a pre-established value and wherein the potential conflict detection unit accepts a composite access record when the ready signal is active.

15. The multithread processing engine of claim 11 wherein composite access record generator further includes a timer that is updated periodically and generates a ready signal when the timer reaches a pre-established value and wherein the potential conflict detection unit accepts a composite access record when the ready signal is active.

16. A multithread processing engine comprising:
  plurality of processing cores;
  memory conflict detection unit that is communicatively coupled with a memory port included in each processing core and that comprises:
    plurality of distinguished access detectors that recognize distinguished instructions and that extract an address from a memory transaction received by way of the plurality of memory ports included in the plurality of processing cores and generate composite access record update signals when an extracted address corresponds to a distinguished memory operation;
    plurality of composite access record generators that each generate a composite access record according to an extracted address received from the plurality of distinguished access detectors according to a composite access record update signal; and
    potential conflict detect unit that generates a potential conflict signal when any of the generated composite access records overlap and wherein the memory conflict detection unit generates a potential conflict signal back to the plurality of processing cores.

17. The multithread processing engine of claim 16 wherein the distinguished access detector includes a range comparator for determining when an address received is within a distinguished range.

18. The multithread processing engine of claim 16 wherein the distinguished access detector receives from a processing core a distinguished access signal in order to identify a memory transaction that is a distinguished memory operation.

19. The multithread processing engine of claim 16 wherein the potential conflict detect unit initializes an inter-thread conflict detect signal when it receives a potential conflict detect unit initialization signal from a processing core.

20. The multithread processing engine of claim 16 wherein the potential conflict detect unit receives composite access records from the plurality of composite access record generator on at least one of a periodic basis and a pre-established count of distinguished memory operations.

* * * * *